US 12,403,706 B2

United States Patent
Arthur et al.

(10) Patent No.: US 12,403,706 B2
(45) Date of Patent: Sep. 2, 2025

(54) ROBOTICS FOR INKJET PRINTING VEHICLE LIVERY

(71) Applicant: The Boeing Company, Chicago, IL (US)

(72) Inventors: Shane Edward Arthur, Kirkland, WA (US); Matthew Mellin, Seattle, WA (US); John Eric Miller, Savannah, OH (US); Kjersta Larson-Smith, Seattle, WA (US)

(73) Assignee: The Boeing Company, Arlington, VA (US)

( * ) Notice: Subject to any disclaimer, the term of this patent is extended or adjusted under 35 U.S.C. 154(b) by 500 days.

(21) Appl. No.: 17/937,227

(22) Filed: Sep. 30, 2022

(65) Prior Publication Data

US 2024/0109349 A1    Apr. 4, 2024

(51) Int. Cl.
*B41J 25/304* (2006.01)
*B41J 3/407* (2006.01)

(52) U.S. Cl.
CPC ........... *B41J 25/304* (2013.01); *B41J 3/4073* (2013.01)

(58) Field of Classification Search
CPC .............................. B41J 25/304; B41J 3/4073
See application file for complete search history.

(56) References Cited

U.S. PATENT DOCUMENTS

| 4,023,394 A | 5/1977 | Borup |
| 5,204,575 A | 4/1993 | Kanda et al. |
| 5,989,643 A | 11/1999 | Nakagawa et al. |
| 6,446,912 B1 | 9/2002 | Barich et al. |
| 2002/0007788 A1 | 1/2002 | Nonomura et al. |
| 2004/0159555 A1 | 8/2004 | Purdy et al. |
| 2006/0219525 A1 | 10/2006 | Dohi |

(Continued)

FOREIGN PATENT DOCUMENTS

| DE | 102013004144 A1 | 9/2014 |
| EP | 3670204 A1 | 6/2020 |

(Continued)

OTHER PUBLICATIONS

Extended European Search Report dated Mar. 1, 2024, regarding Application 23198111.9, 31 pages.

(Continued)

*Primary Examiner* — Nathan T Leong
(74) *Attorney, Agent, or Firm* — Yee & Associates, P.C.

(57) ABSTRACT

The present disclosure includes a method and apparatus for ink jet printing an exterior surface of a vehicle including a reversibly moveable crossbeam mounted above an open pit; a first track located above the reversibly moveable crossbeam, a first reversibly moveable monument including a first serial robotic manipulator including a first end effector defining a first end effector range of motion based on fully extended reversible movement of the first serial robotic manipulator; a second track located in the open pit beneath the reversibly moveable crossbeam; a second reversibly moveable monument coupled to the second pair of rails, the second reversibly moveable monument including a second end effector defining a second end effector range of motion based on fully extended reversible movement of the second serial robotic manipulator. The first end effector range of motion overlaps the second end effector range of motion.

21 Claims, 29 Drawing Sheets

(56) References Cited

U.S. PATENT DOCUMENTS

| | | | |
|---|---|---|---|
| 2015/0259941 A1 | 9/2015 | Hanson | |
| 2017/0203580 A1* | 7/2017 | Martins Pinto | ........... B05B 3/00 |
| 2018/0016987 A1 | 1/2018 | Howarth et al. | |
| 2018/0201029 A1* | 7/2018 | Mathis | ....................... B41J 2/01 |
| 2019/0299231 A1 | 10/2019 | Fritz et al. | |
| 2020/0324915 A1 | 10/2020 | Wright et al. | |
| 2024/0109095 A1 | 4/2024 | Arthur et al. | |

FOREIGN PATENT DOCUMENTS

| | | |
|---|---|---|
| GB | 2465570 A | 5/2010 |
| JP | 5204575 B2 | 6/2013 |
| WO | 2011018199 A1 | 2/2011 |

OTHER PUBLICATIONS

Extended European Search Report dated Mar. 1, 2024, regarding Application No. 23198132.5, 10 pages.
U.S. Appl. No. 17/937,237, filed Sep. 30, 2022, Shane Edward Arthur.
Office Action dated Oct. 5, 2023, regarding U.S. Appl. No. 17/937,237, 11 pages.
Final Office Action dated Jan. 12, 2024, regarding U.S. Appl. No. 17/937,237, 11 pages.
Office Action, dated Jan. 30, 2025, regarding U.S. Appl. No. 17/937,237, 13 pages.
Notice of Allowance, dated Jul. 8, 2025, regarding U.S. Appl. No. 17/937,237, 16 pages.

* cited by examiner

ROBOTICS FOR INKJET PRINTING VEHICLE LIVERY

CROSS-REFERENCE TO RELATED APPLICATIONS

This application is related to the following patent application entitled "INKJET PRINTING VEHICLE LIVERY", U.S. Ser. No. 17/937,237, filed Sep. 30, 2022, now U.S. Pat. Pub. No. 2024/0109095 A1, published Apr. 4, 2024 and assigned to the same assignee. The aforementioned application is incorporated herein by reference in its entirety for all purposes.

BACKGROUND INFORMATION

1. Field

The present disclosure relates generally to applying designs, such as identifying designs, on the exterior of transportation equipment. More particularly, the present disclosure relates to applying livery on vehicles. Still more particularly, the present disclosure relates to methods and apparatus for printing livery on aircraft using ink jet printing technology. The description provides a disclosure of an inkjet printing process allowing for up to 360° of inkjet printing of a vehicle.

2. Background

Transportation equipment such as aircraft are usually seen in public by many people and are typically painted with a paint scheme or design to raise public awareness of the origin of the service affiliated with the equipment. Livery is an identifying design that designates ownership or affiliation. When new transportation equipment is delivered, the original owner or lessee usually wants to apply livery to identify the origin of their service. Similarly, when the owner or lessee of transportation equipment changes, the new management of that equipment usually wants to change the livery to identify the origin of the new service. Consequently, there is a need for technology to apply attractive, durable livery in an economical manner.

In the past, livery has been applied to exterior surfaces of transportation equipment by spray painting. A practical constraint of spray painting is that preparation of the surface requires expensive infrastructure such as specific air flow patterns and explosion proof equipment. The spray-painting operation itself has infrastructure requirements. Another practical constraint of spray painting is that clear-coating over the livery also requires air filtration, specific air flow patterns and explosion proof equipment. There is a need to reduce these infrastructure costs.

Another issue with spray painting is that all the individual operations require time. Initial preparation, subsequent preparation, painting and clear coating all take time. In particular, drying time is required. There is a need to reduce time requirements to increase throughput and reduce overall costs.

Another issue with spray painting livery is that the spray paint equipment needs to be repositioned over the surface of the vehicle to cover the entire surface. Transportation vehicles can be large and the movement of equipment is nontrivial because of their size and weight and because of lost time. There is a need to reduce the need for repositioning equipment.

Another issue with spray painting livery is that existing robotic manipulators are not optimized for large vehicles. Transportation vehicles have exterior features such as lights, antennas, and other obstructions. There is a need for robotic manipulators that accommodate obstructions and simultaneously provide optimum approach to the exterior surface with regard to both direction and distance.

Another issue with spray painting livery is that individual operations may have sub-steps that have different requirements. The sub-steps may be required across a large surface area that is beyond the reach of just one robotic manipulator. There is a need for arranging these sub-steps in sequence with regard to surface area elements.

Another issue with spray painting livery colors is that edge resolution and minimum size of features is constrained by the spray paint equipment. There is a need to improve resolution of livery colors.

Another issue with spray painting livery is that the number of different colors that can be utilized per unit surface area is, in practice, limited by the spray paint equipment. There is a need for a more spatially agile pallet of colors.

Therefore, it would be desirable to have methods and apparatus that take into account at least some of the issues discussed above, as well as other possible issues. For example, it would be desirable to have methods and apparatus that overcome technical problems with applying livery on aircraft and other transportation equipment.

SUMMARY

An embodiment of the present disclosure provides an apparatus for ink jet printing an exterior surface of a vehicle comprising a reversibly moveable crossbeam mounted above an open pit; a first track located above the reversibly moveable crossbeam, the first track comprising a first pair of rails; a first reversibly moveable monument coupled to the first pair of rails, the first reversibly moveable monument comprising a first serial robotic manipulator comprising a first end effector defining a first end effector range of motion based on fully extended reversible movement of the first serial robotic manipulator; a second track located in the open pit beneath the reversibly moveable crossbeam; the second track comprising a second pair of rails; and a second reversibly moveable monument coupled to the second pair of rails, the second reversibly moveable monument comprising a second serial robotic manipulator comprising a second end effector defining a second end effector range of motion based on fully extended reversible movement of the second serial robotic manipulator, wherein the first end effector range of motion overlaps the second end effector range of motion.

In yet another embodiment of the present disclosure, a method of ink jet printing an exterior surface of a vehicle comprises providing a reversibly moveable crossbeam mounted above an open pit; providing a first track located above the reversibly moveable crossbeam, the first track comprising a first pair of rails; providing a first reversibly moveable monument coupled to the first pair of rails, the first reversibly moveable monument comprising a first serial robotic manipulator comprising a first end effector defining a first end effector range of motion based on fully extended reversible movement of the first serial robotic manipulator; providing a second track located in the open pit beneath the reversibly moveable crossbeam; the second track comprising a second pair of rails; providing a second reversibly moveable monument coupled to the second pair of rails, the second reversibly moveable monument comprising a second serial robotic manipulator comprising a second end effector defining a second end effector range of motion based on fully extended reversible movement of the second serial robotic manipulator, wherein the first end effector range of motion overlaps the second end effector range of motion; moving the first end effector; and moving the second end effector, wherein the first end effector extends into the second end effector range of motion or the second end effector extends into the first end effector range of motion.

In still another embodiment of the present disclosure, an apparatus for ink jet printing an exterior surface of a vehicle, comprises: a first reversibly moveable crossbeam mounted above an open pit; a second reversibly moveable crossbeam mounted above an open pit; a first track located above the reversibly moveable crossbeam, the first track comprising a first pair of rails; a first reversibly moveable monument coupled to the first pair of rails, the first reversibly moveable monument comprising a first serial robotic manipulator comprising a first end effector defining a first end effector range of motion based on fully extended reversible movement of the first serial robotic manipulator; a second track located in the open pit beneath the reversibly moveable crossbeam; the second track comprising a second pair of rails; and a second reversibly moveable monument coupled to the second pair of rails, the second reversibly moveable monument comprising a second serial robotic manipulator comprising a second end effector defining a second end effector range of motion based on fully extended reversible movement of the second serial robotic manipulator, wherein the first end effector range of motion overlaps the second end effector range of motion, wherein the first end effector comprises a first interchangeable ink jet print head and the second end effector comprises a second interchangeable ink jet print head, and wherein the first end effector range of motion overlaps the second end effector range of motion by approximately 10 percent by total.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described below. For example, FIG. 1, is a block schematic diagram of an ink jet printing environment 100 depicted in accordance with an illustrative embodiment.

Figure 1:
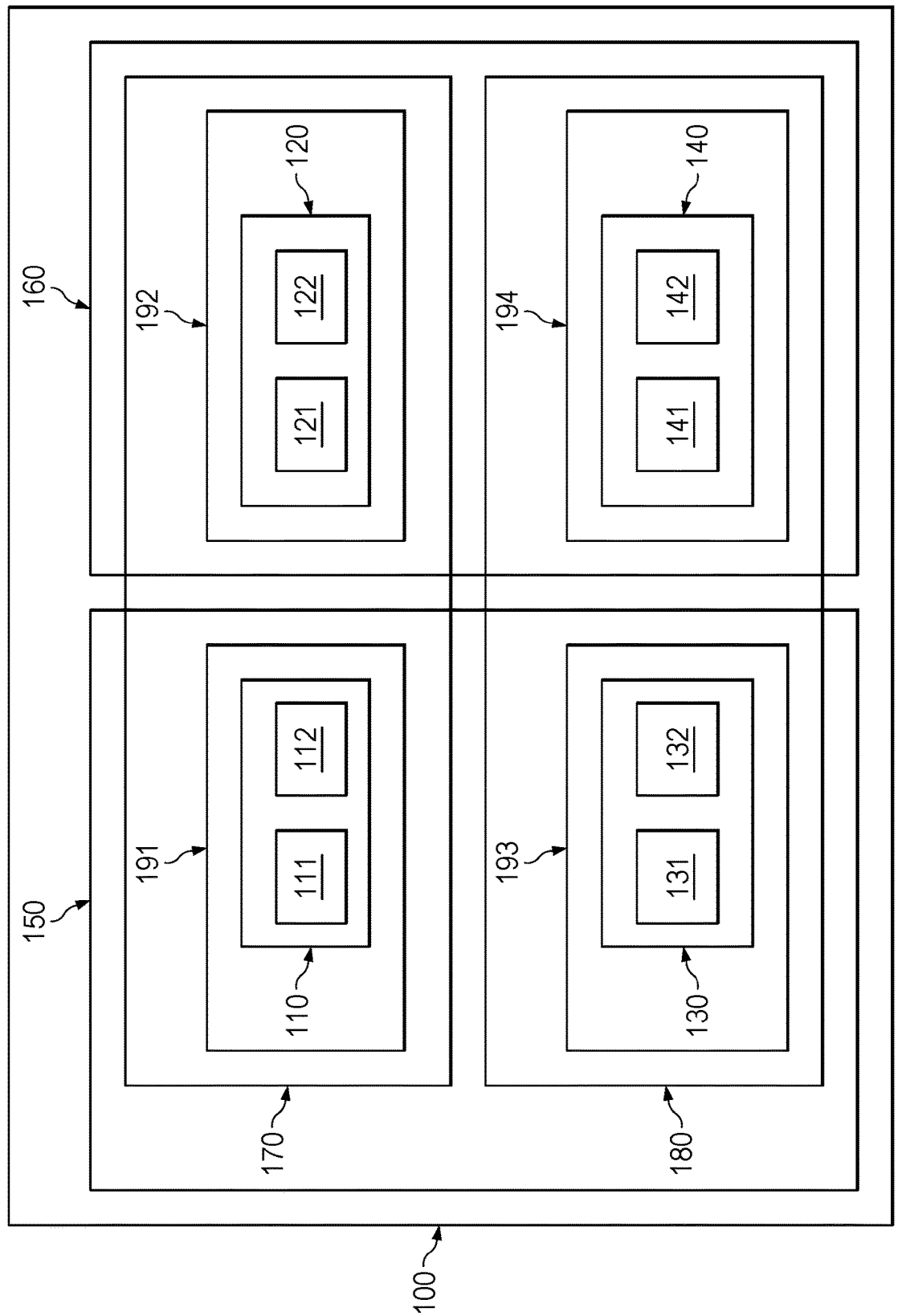
FIG. 1 is an illustration of a block schematic diagram environment for ink jet printing a vehicle in accordance with an illustrative embodiment.

FIG. 1 shows a block schematic view of a first reversibly moveable monument 110. The first reversibly moveable monument 110 includes a first arm 111 and a second arm 112. A second reversibly moveable monument 120 is coupled to the first reversibly moveable monument. The second reversibly moveable monument 120 includes a first arm 121 and a second arm 122. A third reversibly moveable monument 130 is coupled to the second reversibly moveable monument. The third reversibly moveable monument 130 includes a first arm 131 and a second arm 132. A fourth reversibly moveable monument 140 is coupled to the third reversibly moveable monument. The fourth reversibly moveable monument 140 includes a first arm 141 and a second arm 142.

One, some or all of the arms can include a 3+2+3 serial joint manipulator with a proximal arm and a distal arm. The proximal arm is located between a shoulder and an elbow. The distal arm is located between the elbow and a wrist. The shoulder has 3 dimensions of movement. The elbow has two dimensions of movement. And the wrist has three dimensions of movement. This manipulator configuration is important in the context of processing large objects such as vehicles ink jet printing The first reversibly moveable monument and the third reversibly moveable monument are operationally coupled together in a first overlap group 150. The overlap group includes at least one top row (e.g. overhead) monument with its end effectors and at least one bottom row (e.g. in the open pit) monument with its end effectors. The second reversibly moveable monument and the fourth reversibly moveable monument are operationally coupled together in a second overlap group 160. The overlap groups are important because they solve multiple problems described above. The overlap is intended to mean the intercept between 2 quasi-hemispheres defined by the arms' range of motion. This can be used to define 1, 5, 10, 20, etc. overlap percentage by total. In an embodiment, the range of motion overlaps the second end effector range of motion by 1, 5, 10, 20, etc., and for example approximately 5 or 10 percent.

The first reversibly moveable monument and the second reversibly moveable monument are operationally coupled together in a first concerted group 170. The concerted group includes at least two top row (e.g. overhead) monuments with their end effectors or at least two bottom row (e.g. in the open pit) monuments with their end effectors. The third reversibly moveable monument and the fourth reversibly moveable monument are operationally coupled together in a second concerted group 180. The concerted groups are important because they solve multiple problems described above. The concerted group is based on concerted operation (e.g. movement) of its group members. This can be used to define sequential movement or movements. In an embodiment, the end effectors on the two concerted group monuments are different where there is both a large area print head tool and a small area detail print head tool. For instance, the large area tools are operated first with regard to the exterior surface of a vehicle and then the small area detail tools are operated second with regard to finishing the edges of the exterior surface.

The first reversibly moveable monument can be mounted on a first track 191. The second reversibly moveable monument can be mounted on a second track 192. In an embodiment, the first track and the second track are the same to facilitate concerted movement with regard to sequencing. The third reversibly moveable monument can be mounted on a third track 193. The fourth reversibly moveable monument can be mounted on a fourth track 194. In an embodiment, the third track and the fourth track are the same to facilitate concerted movement.

Figure 2:
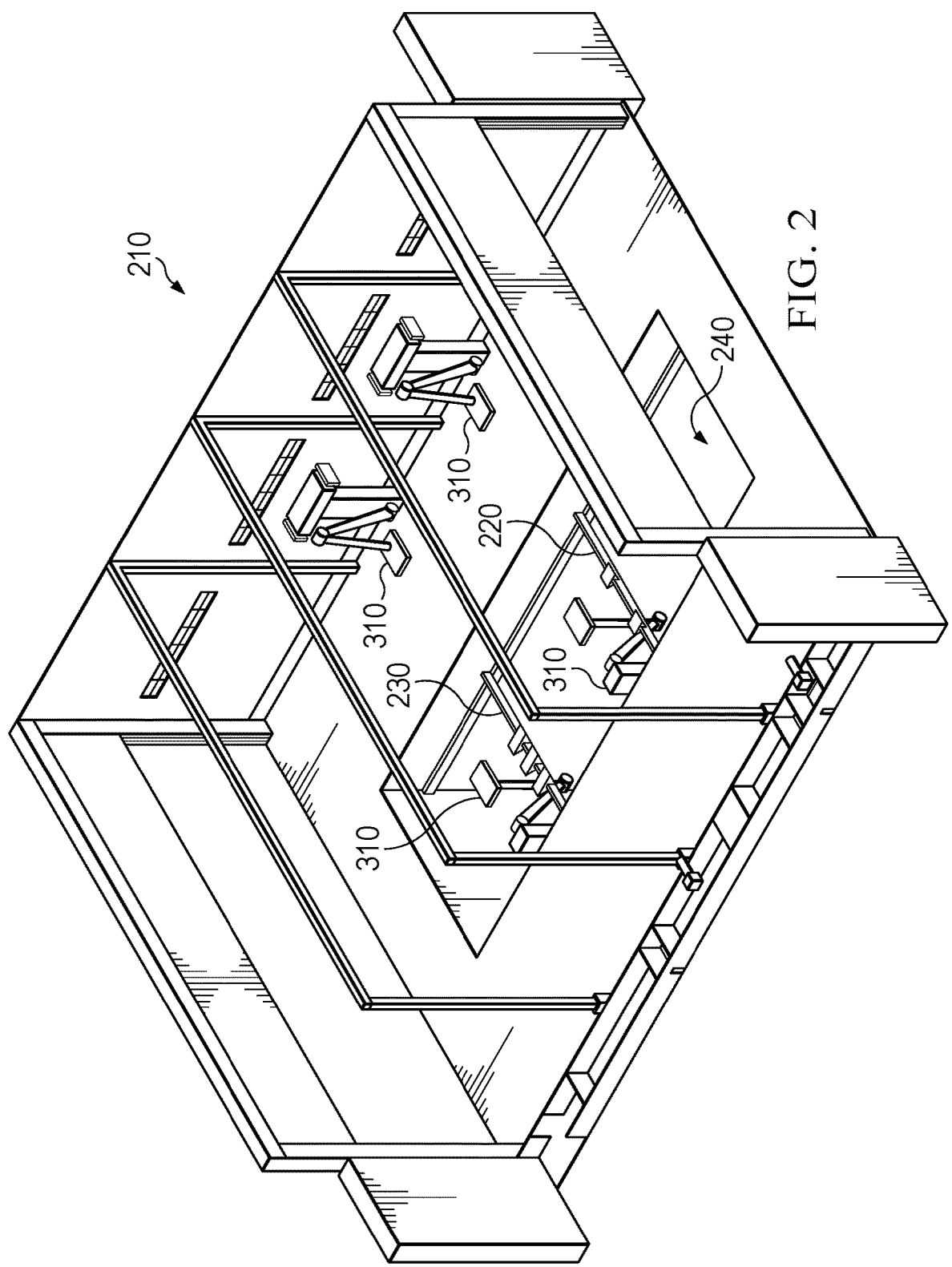
FIG. 2 is an illustration of an isometric view of a bay for ink jet printing livery on an exterior surface of a vehicle in accordance with an illustrative embodiment.

FIG. 2 shows an isometric open top view of a bay 210 for ink jet printing an exterior surface of a vehicle. In this embodiment, OSIRIS (Operations System for Inkjet Rendered Interferenced Surfaces) includes four monuments 310 that work together. In this embodiment, two of the monuments are located above a first crossbeam 220 and a second crossbeam 230. Further, two of the monuments are located in an open pit 240 beneath the first crossbeam 220 and the second crossbeam 230. Important aspects of embodiments of this disclosure are range of motion and pose-ability of the multiple end effectors.

Figure 3:
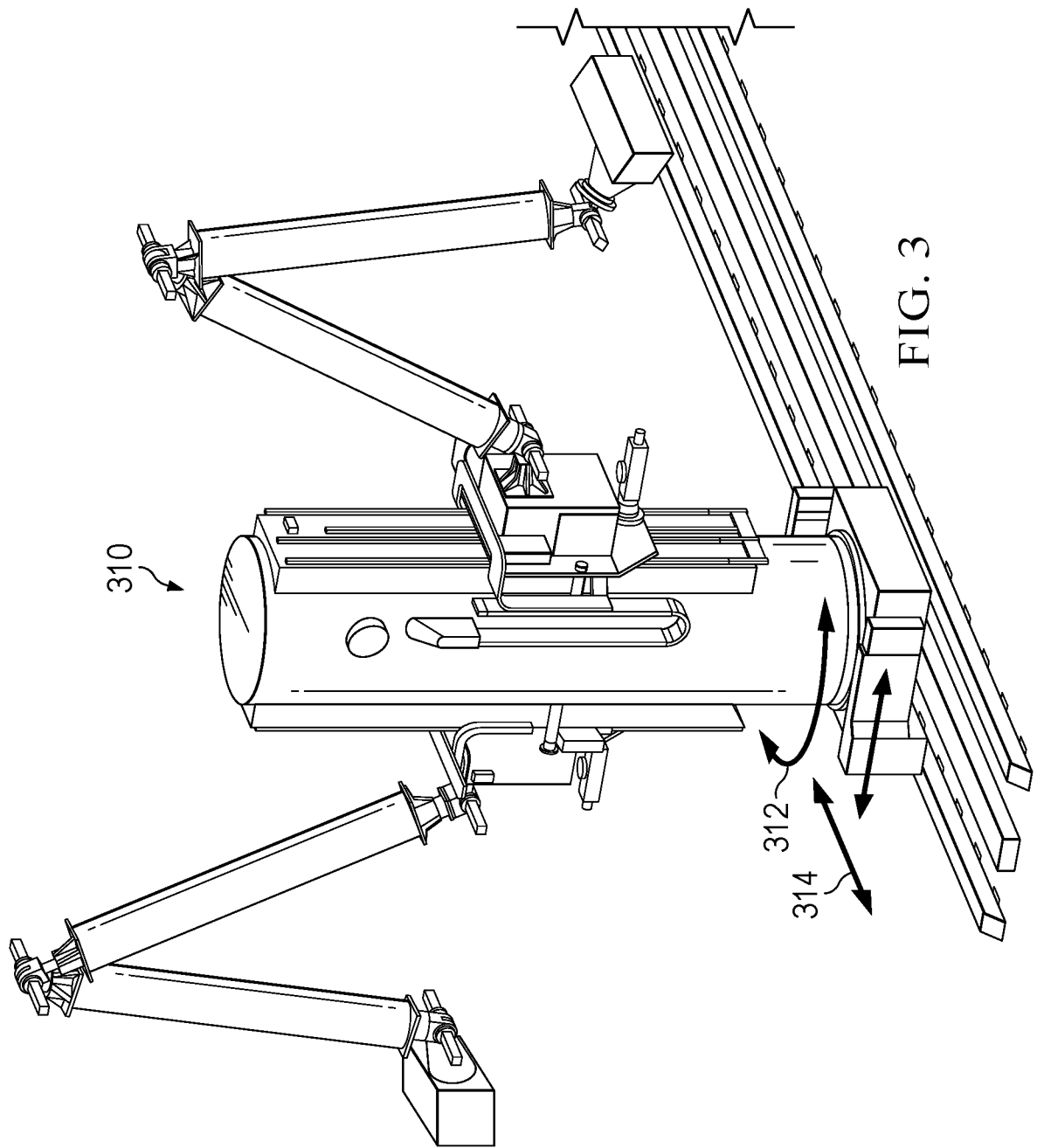
FIG. 3 is an illustration of an isometric view of a reversibly moveable monument coupled to a track or rail in accordance with an illustrative embodiment.

FIG. 3 shows an isometric view of a reversibly moveable monument 310 coupled to rails that are coupled to a track. In an embodiment, this is one of the monument systems. In embodiments, there may be 2, 3, 4 or more monuments systems. that make up the OSIRIS system. The circles 312 and rectangles 314 in the images are intended to provide a visual context reflecting the actual range of motion for each joint in the system. They are only shown on the base, main body and one side of the structure. They are not present on the physical equipment.

Figure 4:
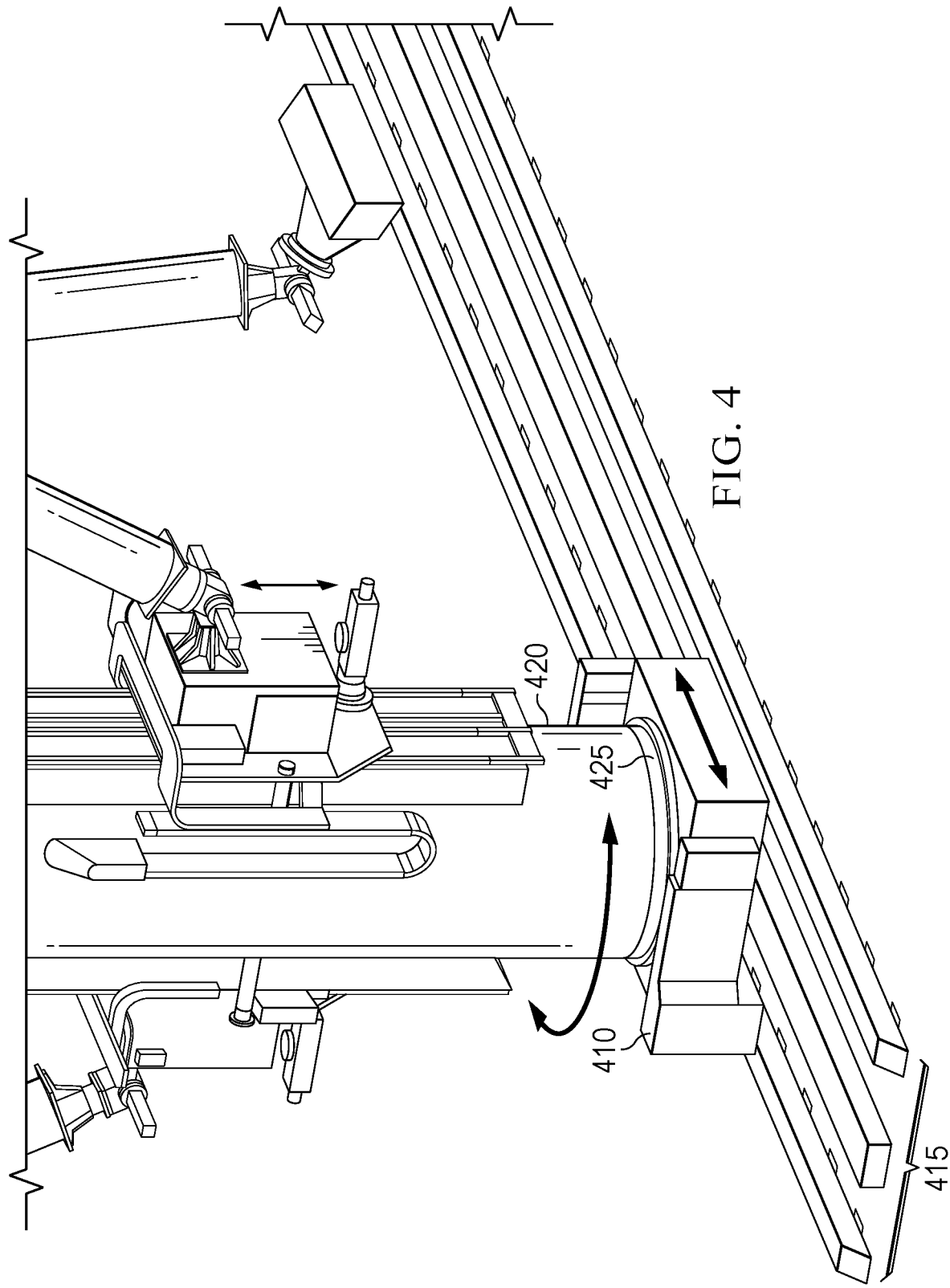
FIG. 4 is an illustration of an isometric view of the base of the reversibly moveable monument in accordance with an illustrative embodiment.

FIG. 4 shows an isometric view of a base of the reversibly moveable monument. The system range of motion begins with a rectangular base 410 that is mounted on a rail system 415. This provides linear positioning along the length of the intended exterior surface to be treated. The second joint 425 includes a cylindrical main body 420 that is able to be rotated half of a full circle.

Figure 5:
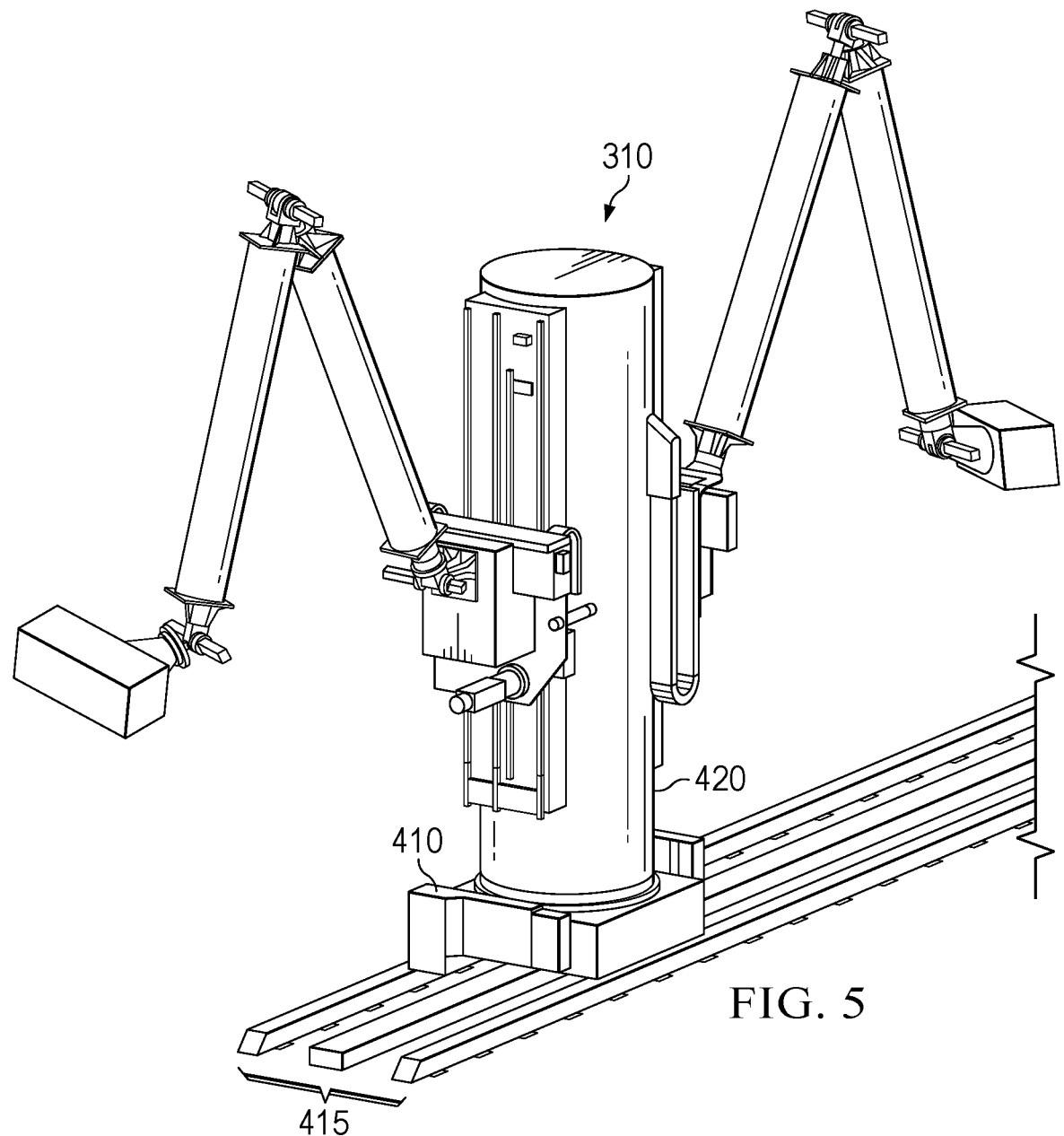
FIG. 5 is an illustration of an isometric view of the reversibly moveable monument rotated approximately 90 degrees with respect to the track in accordance with an illustrative embodiment.

FIG. 5 shows an isometric view of the reversibly moveable monument rotated approximately 90 degrees with respect to the track. This image illustrates the rectangular base 410 translated into position on the rail system 415 and the cylindrical main body 420, shown rotated at 90° compared to the position of the body shown in FIG. 4. The reversibly moveable monument includes a base coupled to the first pair of rails, the base providing reversible movement parallel to first track; and a cylindrical main body coupled to the base, the cylindrical main body providing an axis of reversible rotary movement around an axis normal to the first pair of rails.

Figure 6:
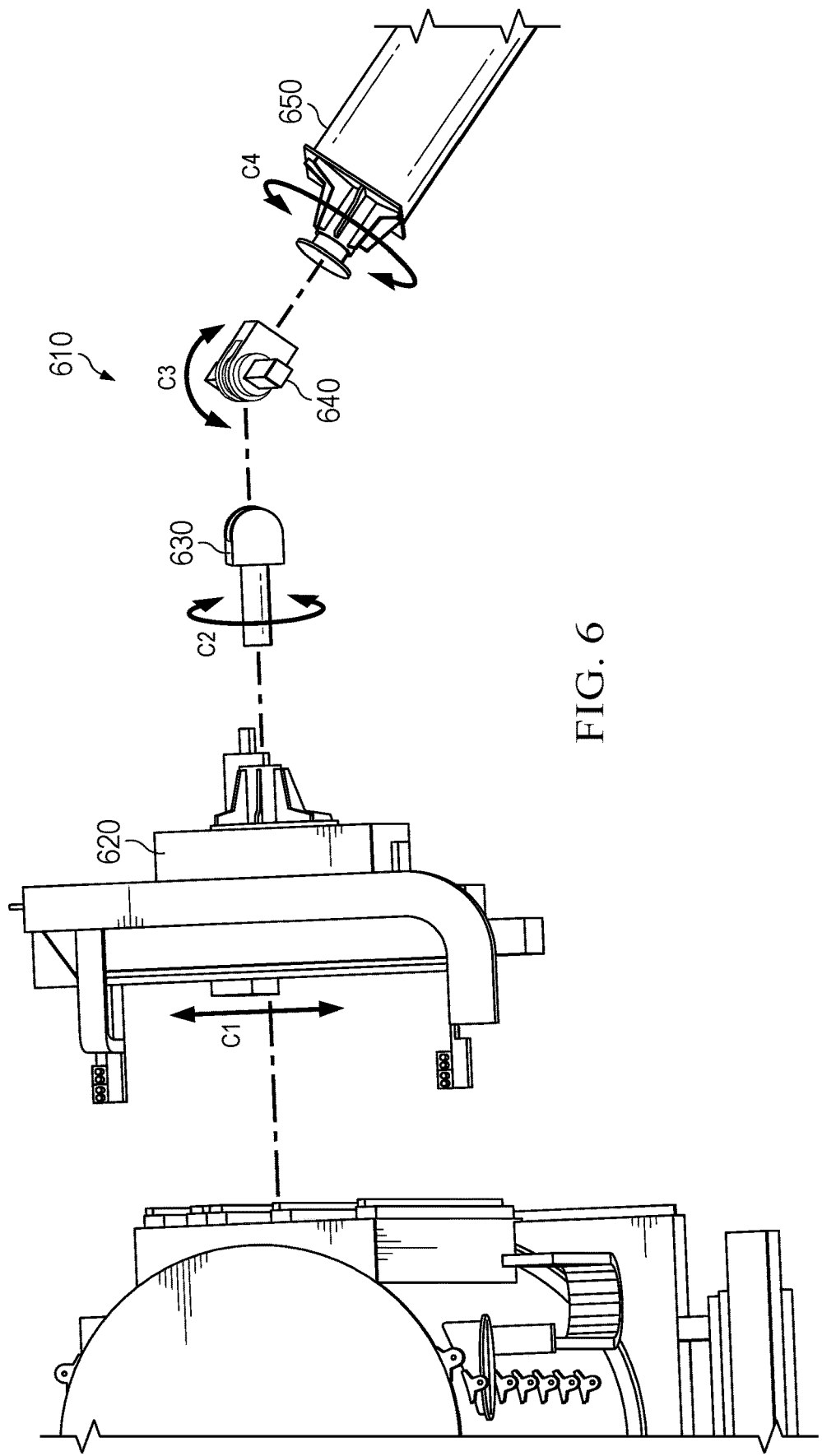
FIG. 6 is an illustration of an isometric view of a shoulder joint of the reversibly moveable monument in accordance with an illustrative embodiment.

FIG. 6 shows an exploded isometric view of a shoulder joint 610 of the reversibly moveable monument. The shoulder joint includes an orthogonal joint 620 (C1) that is able to translate up and down the main body, allowing the system to reach both higher and lower areas of the exterior surface. Coupled to the orthogonal joint (C1) is a first twisting joint 630 (C2) that allows the arm to rotate up to 270° between hanging downward, to all the way up and over. Coupled to the first twisting joint is a rotational joint 640 (C3) that allows the arm to pivot close to the main body or extend horizontally away from the body similar to a door hinge. Coupled to the rotational joint is a second twisting joint 650 (C4) that allows for rotating the elbow and forearm joints. The various joints including C1, C2, C3 and C4 allow for arm rotation up to 270°.

Figure 7:
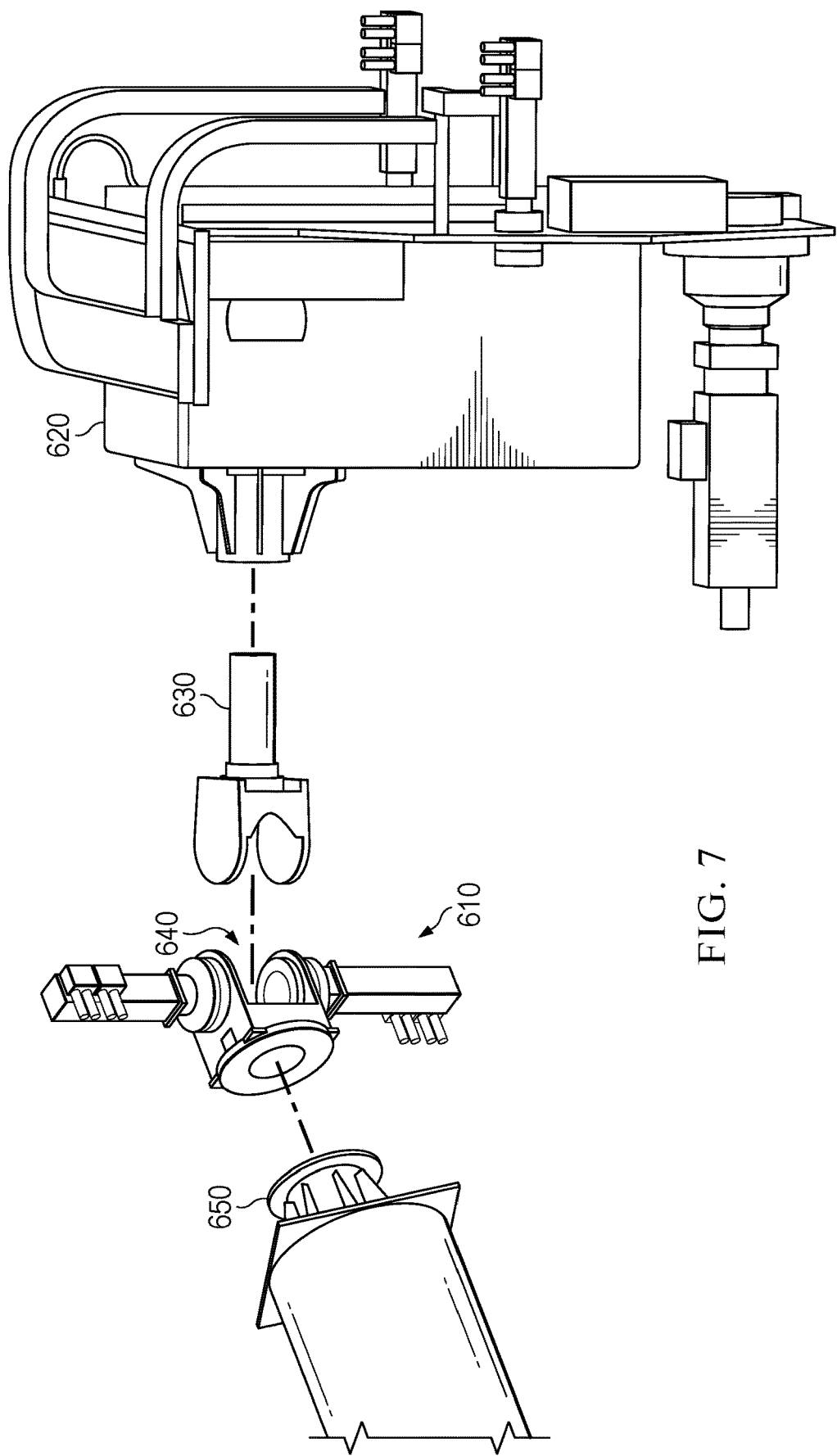
FIG. 7 is an illustration of an isometric view of the shoulder joint in accordance with an illustrative embodiment.

FIG. 7 shows an isometric view of the shoulder joint 610. This image illustrates the shoulder joint separated for closer examination. The orthogonal joint 620 is coupled to the first twisting joint 630 that is coupled to the rotational joint 640 that is coupled to the second twisting joint 650. The reversibly moveable monument includes: a shoulder joint coupled to the cylindrical main body, the shoulder joint including an orthogonal joint providing reversible linear movement along an axis normal to the first track; a first twisting joint coupled to an output link of the orthogonal joint, the first twisting joint providing reversible rotary movement around an axis that is parallel to the output link of the orthogonal joint; a rotational joint coupled to an output link of the first twisting joint, the rotational joint providing reversible rotary movement around an axis that is orthogonal to the output link of the first twisting joint; and a second twisting joint coupled to an output link of the rotational joint, the second twisting joint providing reversible rotary movement around an axis that is orthogonal to the output link of the rotational joint.

Figure 8:
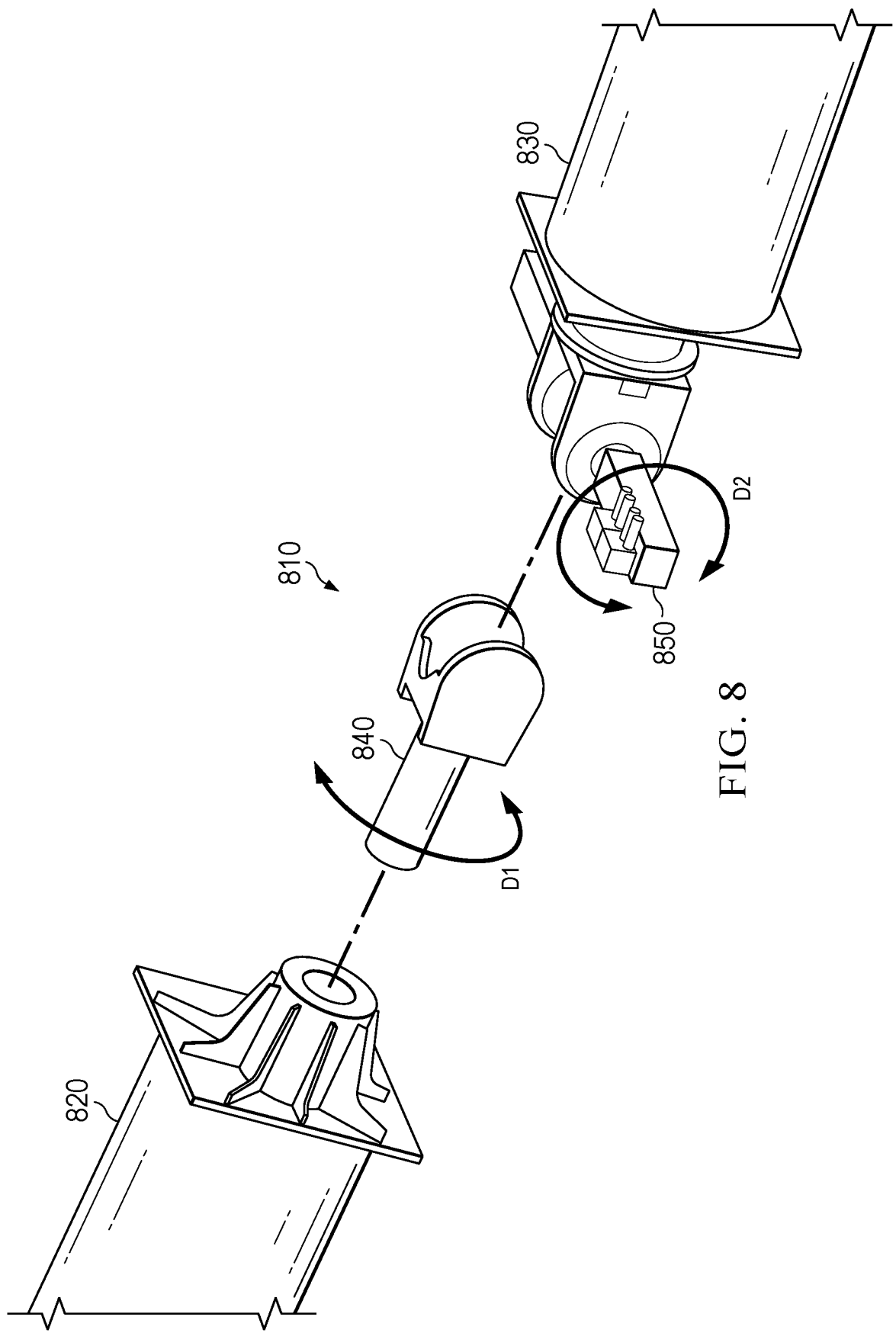
FIG. 8 is an illustration of an isometric view of an elbow joint in accordance with an illustrative embodiment.
Figure 9:
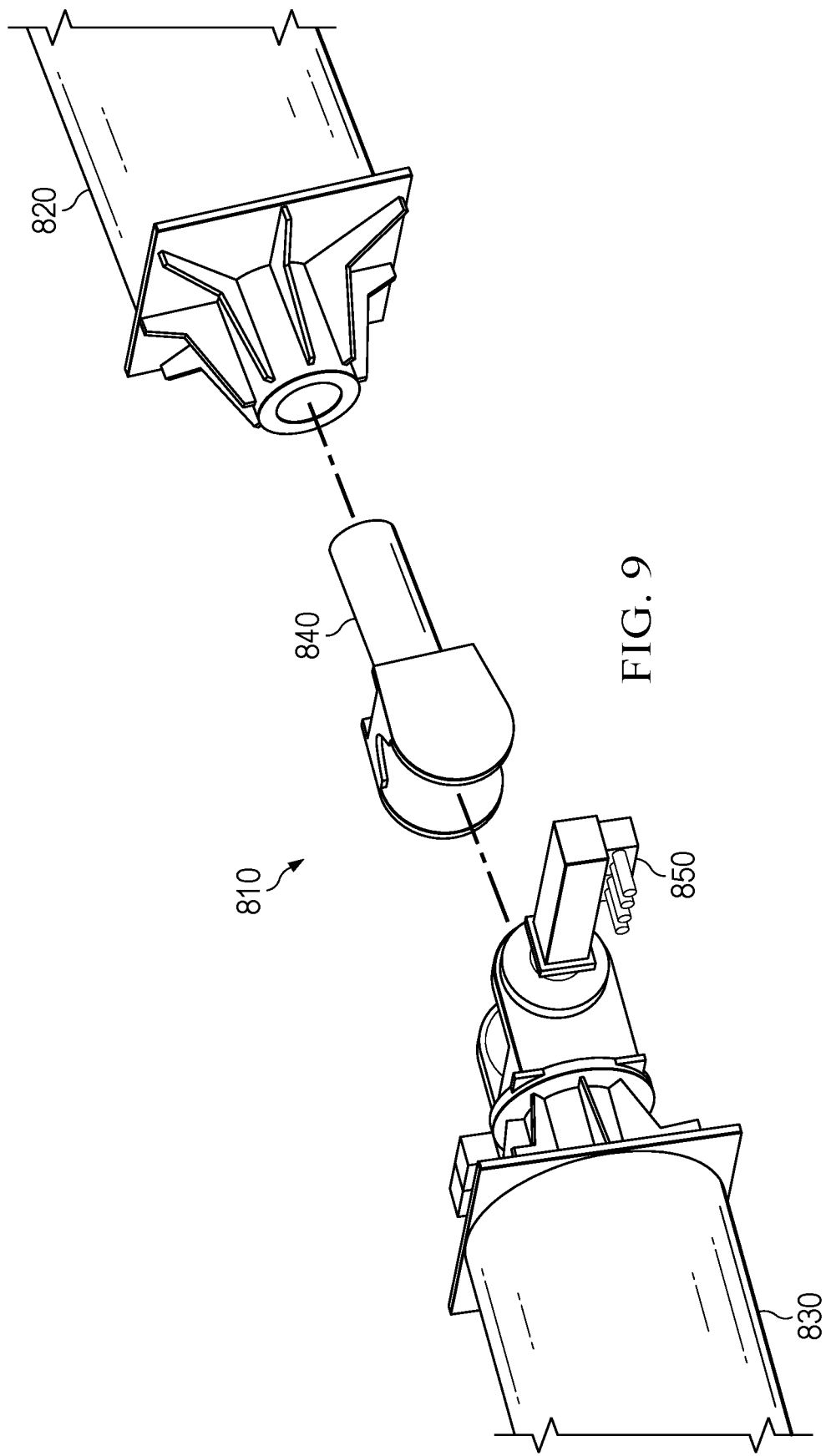
FIG. 9 is an illustration of an isometric view of the elbow joint in accordance with an illustrative embodiment.

FIG. 8 shows an isometric view of an elbow joint 810. The elbow joint is coupled between a proximal arm 820 and a distal arm 830. The elbow joint 810 is shown here exploded. The elbow joint includes a third twisting joint 840 (D1). The third twisting joint is coupled to a distal end of the proximal arm. the elbow joint includes an elbow rotational joint 850 (D2). The elbow rotational joint is coupled to an output link of the third twisting joint. The third twisting joint is able to rotate similar to (C4) this third twisting joint can also be fixed. Elbow rotational joint (D2) is a rotary joint allowing the elbow to bend. This motion will bring the end effector either closer to the body or extend it even further away for extended reach beyond the initial shoulder extension. The D1 and D2 twisting joints are able to bend and/or twist FIG. 9 shows an isometric view of the elbow joint 810. This image illustrates the third twisting joint and the elbow rotational joint separated and from another perspective for closer examination. The reversibly moveable monument includes: a proximal arm coupled to an output link of the second twisting joint; and an elbow joint coupled to a distal end of the proximal arm, the elbow joint including: a third twisting joint coupled to the distal end of the proximal arm, the third twisting joint providing reversible rotary movement around an axis that is parallel to the proximal arm; and an elbow rotational joint coupled to an output link of the third twisting joint, the elbow rotational joint providing rotary movement around an axis that is orthogonal to the proximal arm.

Figure 10:
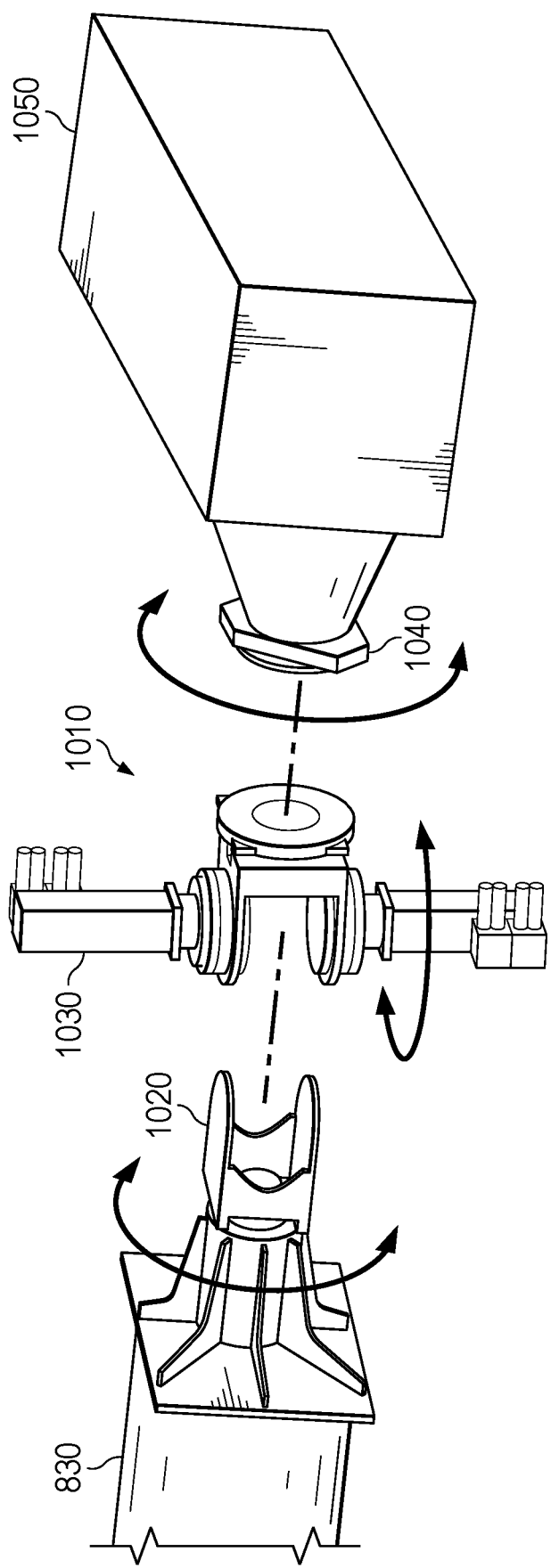
FIG. 10 is an illustration of an isometric view of a wrist joint in accordance with an illustrative embodiment.

FIG. 10 shows an isometric view of a wrist joint 1010. The wrist joint can include a combination of three joints. A first wrist twisting joint 1020 is coupled to the distal arm 830. A wrist rotational joint 1030 is coupled to an output link of the first wrist twisting joint. A second wrist twisting joint 1040 is coupled to an output link of the wrist rotational joint. A first end effector 1050 is coupled to an output link of the second wrist twisting joint.

The first wrist twisting joint 1020 (E1) allows the wrist to rotate in place in order to align the wrist rotational joint 1030 (E2) to align the end effector parallel to the surface where the livery colors are being applied. The second wrist twisting joint 1040 (E3) will rotate the first end effector 1050 around the surface in order to align the applicator to be in position for a linear path applying treatment to the surface. This combination of specific joints at the wrist elbow and shoulder provide significant commercial advantages.

Figure 11:
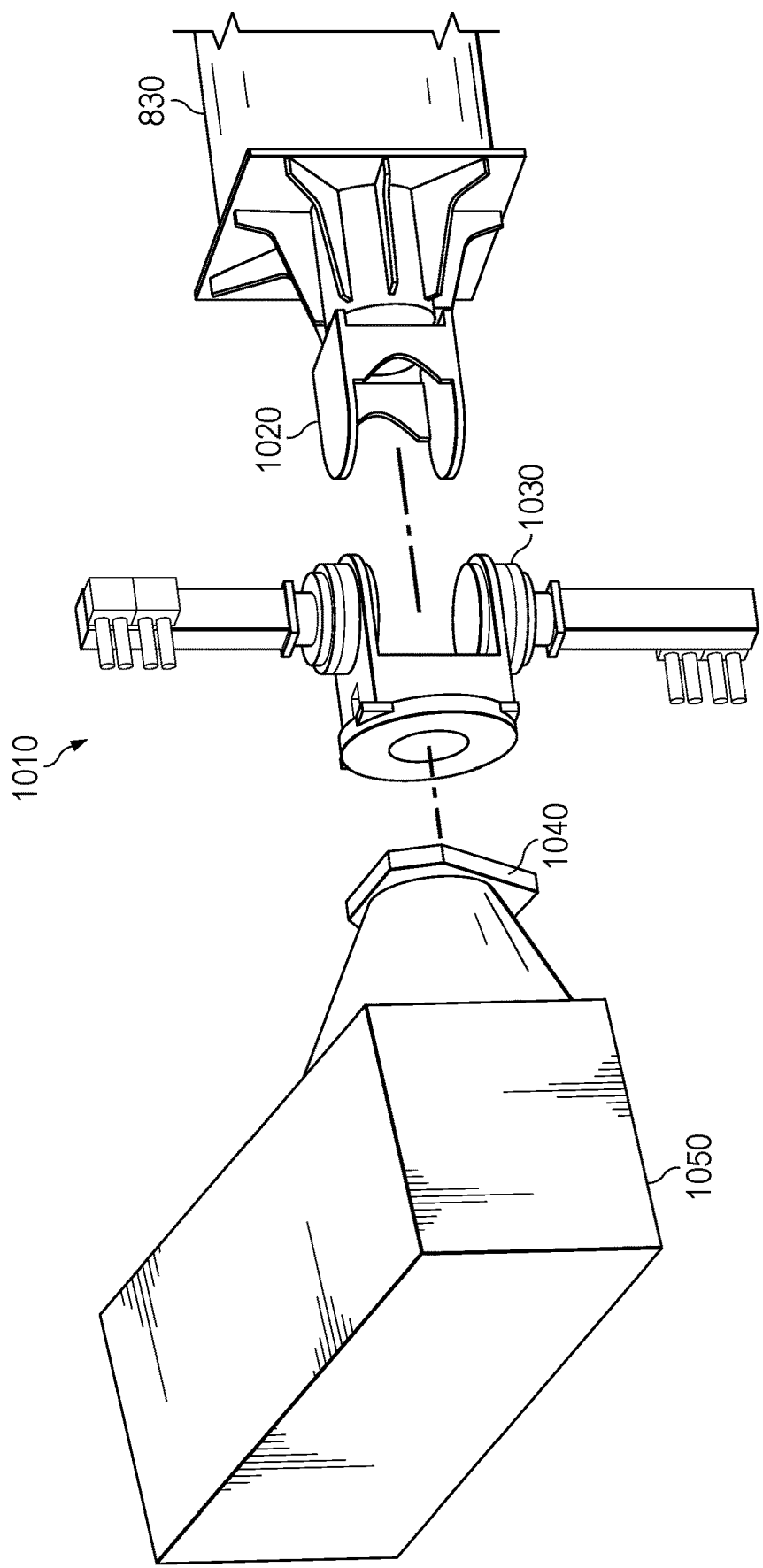
FIG. 11 is an illustration of an isometric view of the wrist joint in accordance with an illustrative embodiment.

FIG. 11 shows an isometric view of the wrist joint 1010 together with the first end effector 1050. This image illustrates the wrist joint separated and from another perspective for closer examination.

Figure 12:
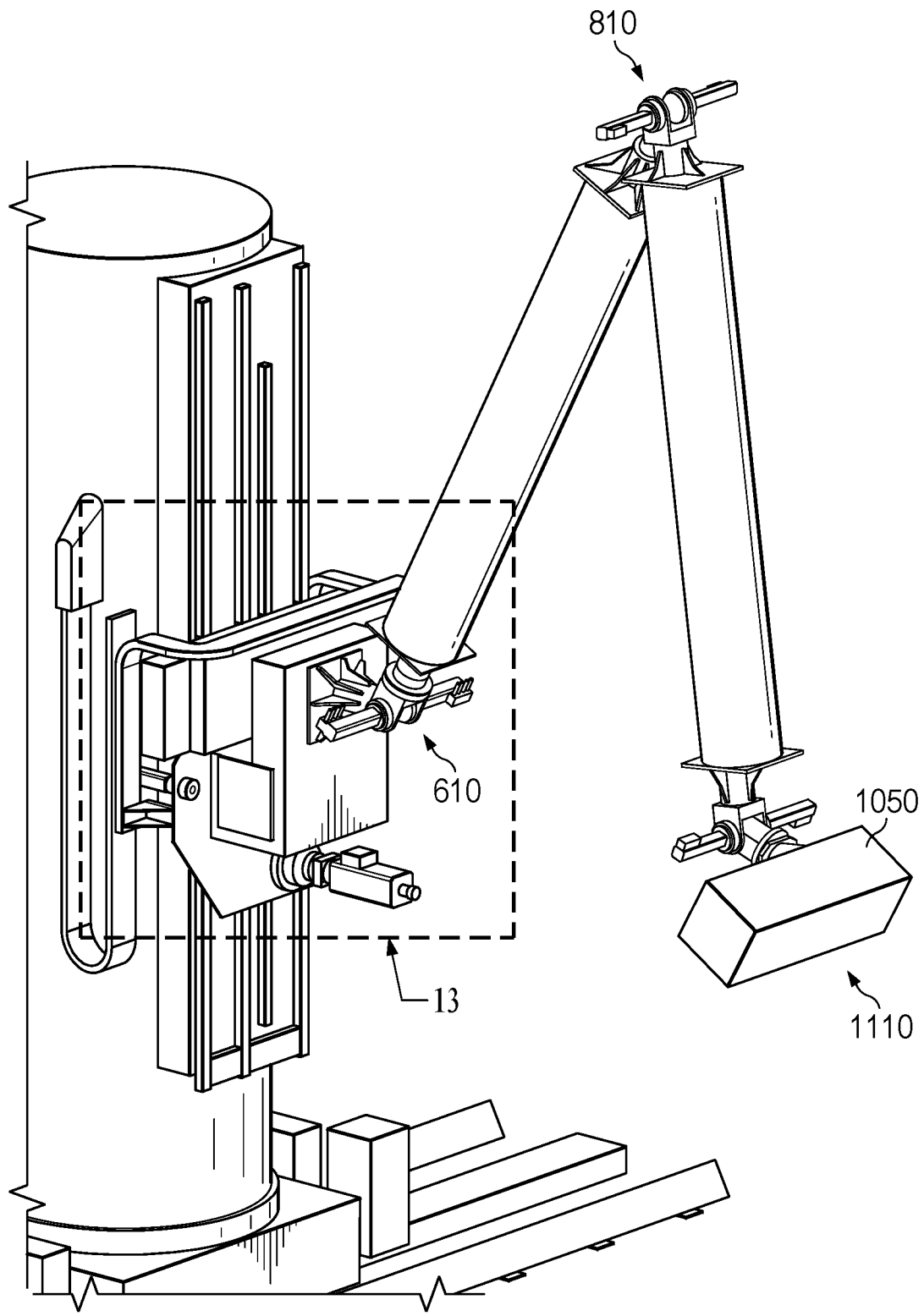
FIG. 12 is an illustration of an isometric view of one side of a reversibly moveable monument in accordance with an illustrative embodiment.

FIG. 12 shows an isometric view of one side of a reversibly moveable monument 310 or tower. Each tower will have a rail joint and a main body rotational joint. Each side of the tower will have a shoulder joint 610, an elbow joint 810, and a wrist joint 1010. Each side of a tower will have an end effector 1050.

Figure 13:
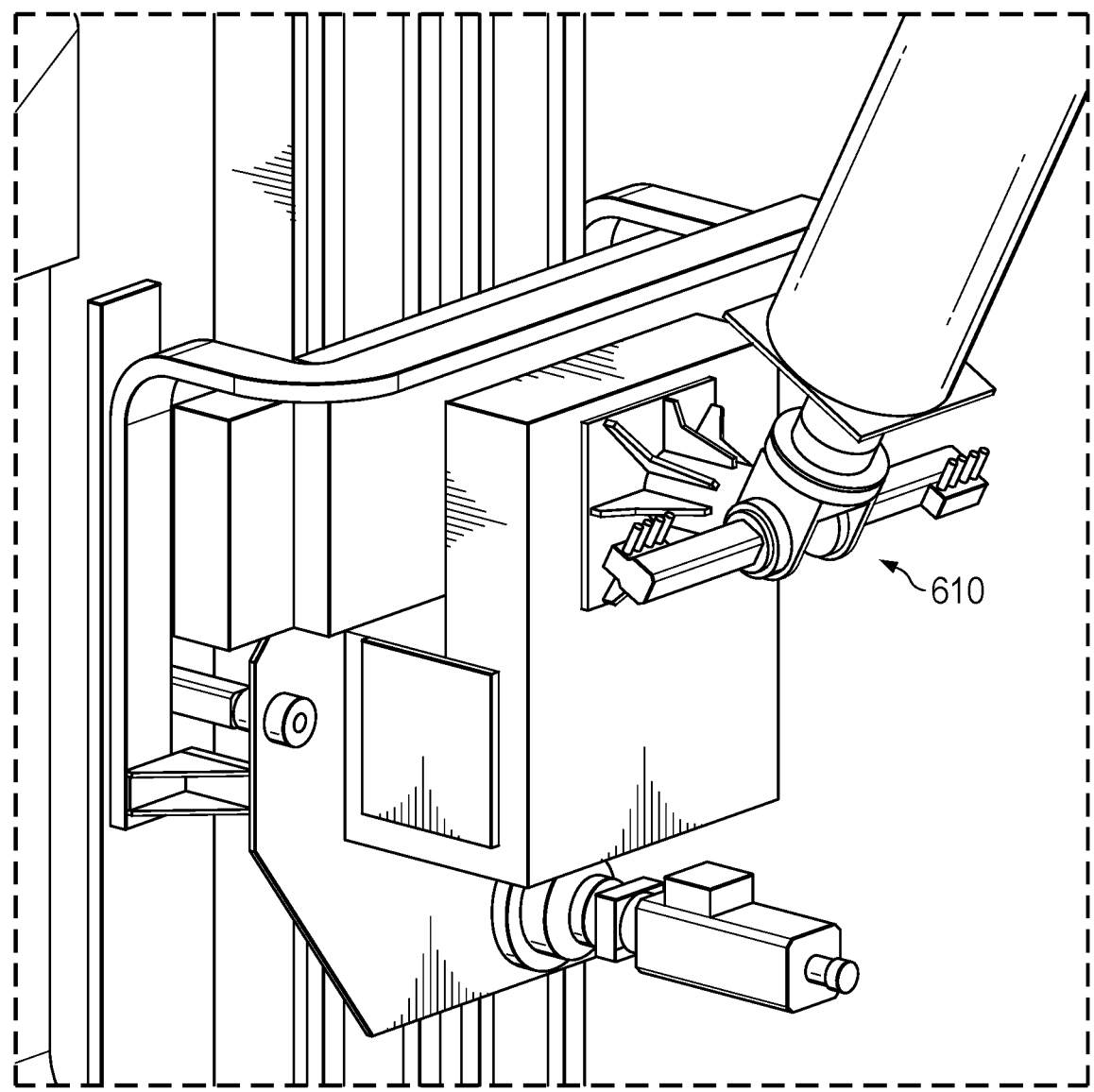
FIG. 13 is an illustration of an isometric view of a shoulder joint in accordance with an illustrative embodiment.

FIG. 13 shows an isometric view of shoulder joint 610 mechanically connected to the side of the tower. Shoulder joint 610 is shown assembled for contextual examination. The shoulder joint 610 provides vertical translation of the manipulator.

Figure 14:
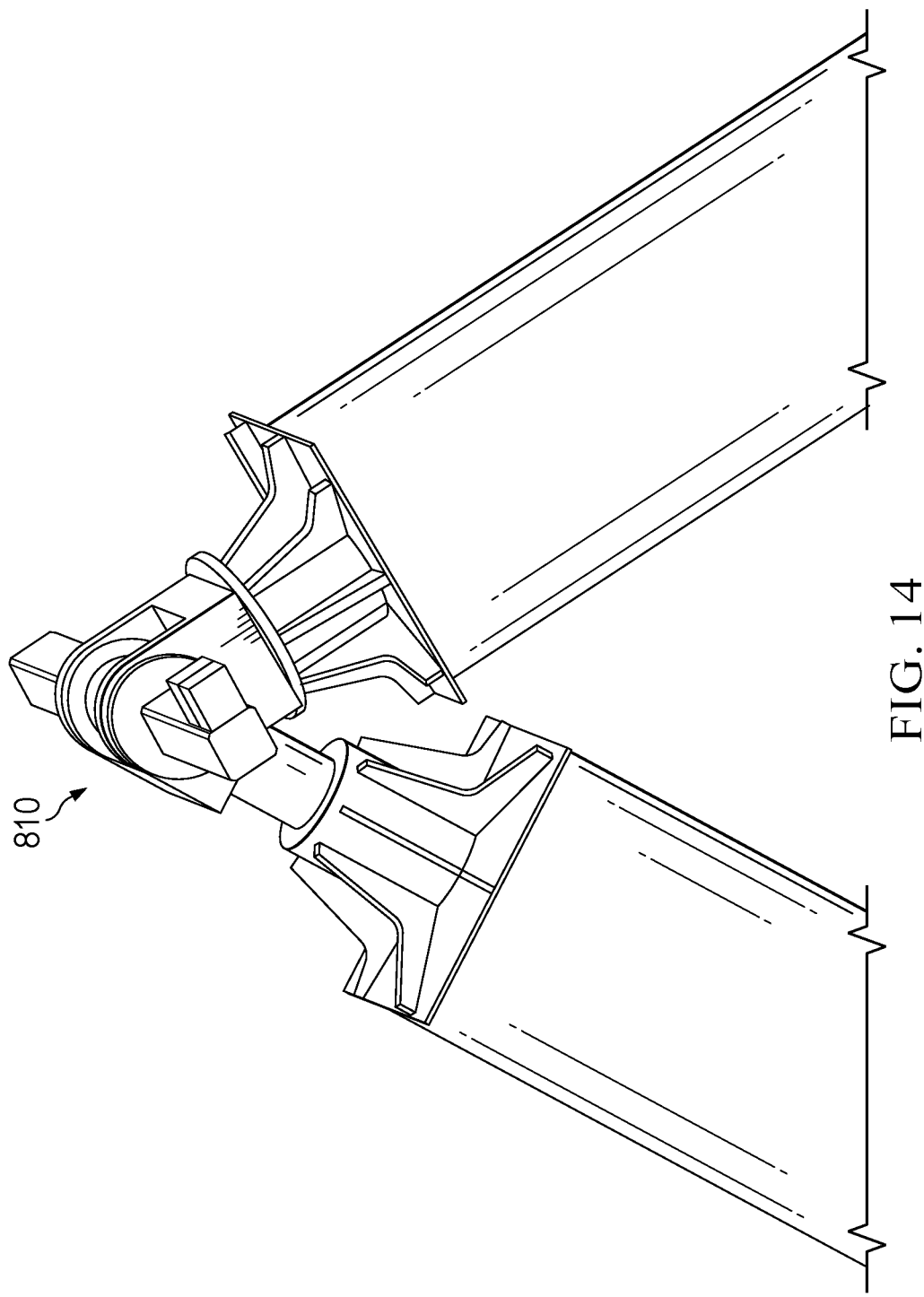
FIG. 14 is an illustration of an isometric view of an elbow joint in accordance with an illustrative embodiment.

FIG. 14 shows an isometric view of elbow joint 810. Elbow joint 810 is shown assembled for contextual examination.

Figure 15:
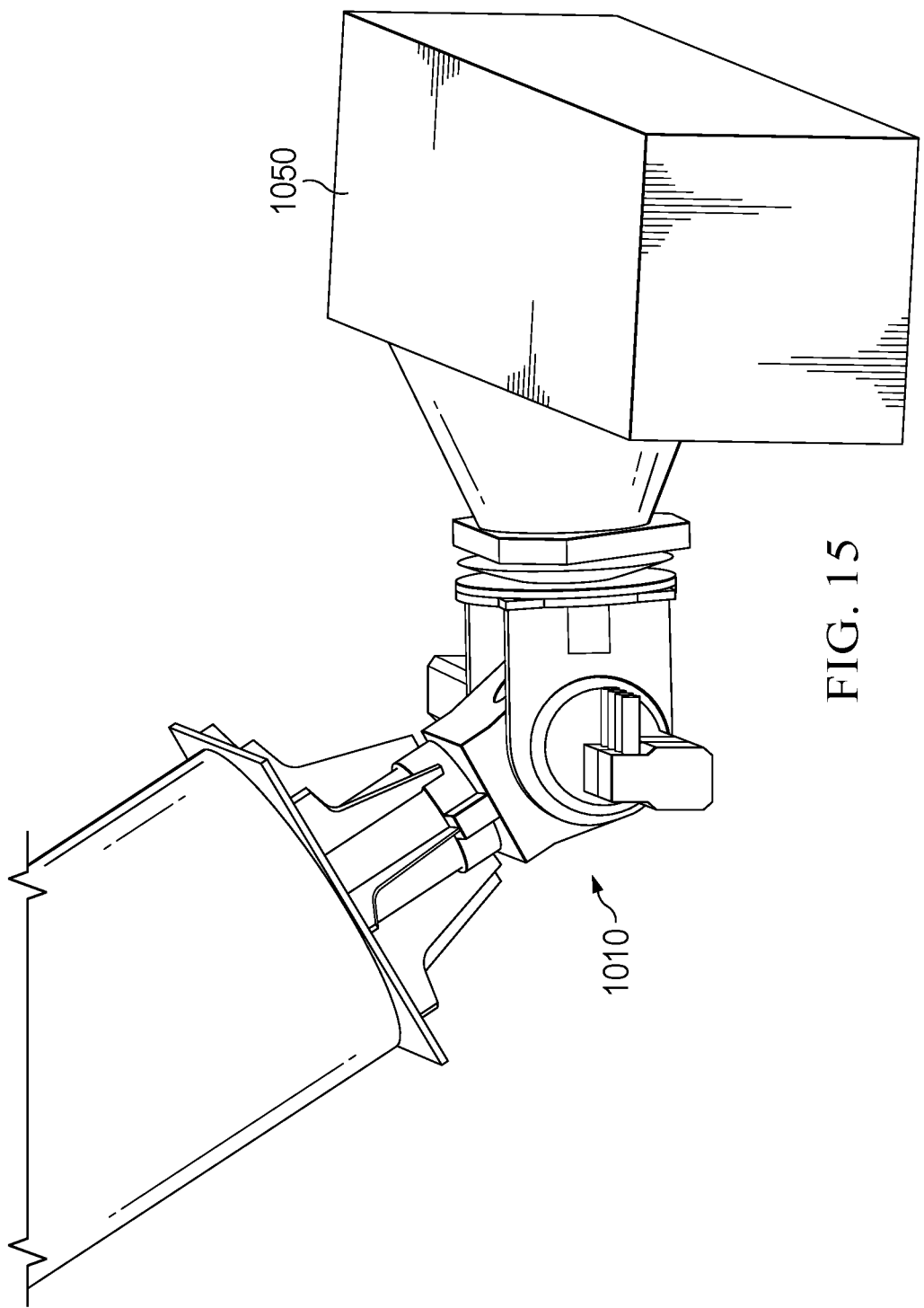
FIG. 15 is an illustration of an isometric view of a wrist joint in accordance with an illustrative embodiment.

FIG. 15 shows an isometric view of wrist joint 1010. Wrist joint 1010 is shown assembled for contextual examination. End effector 1050 is coupled to wrist joint 1010.

Figure 16:
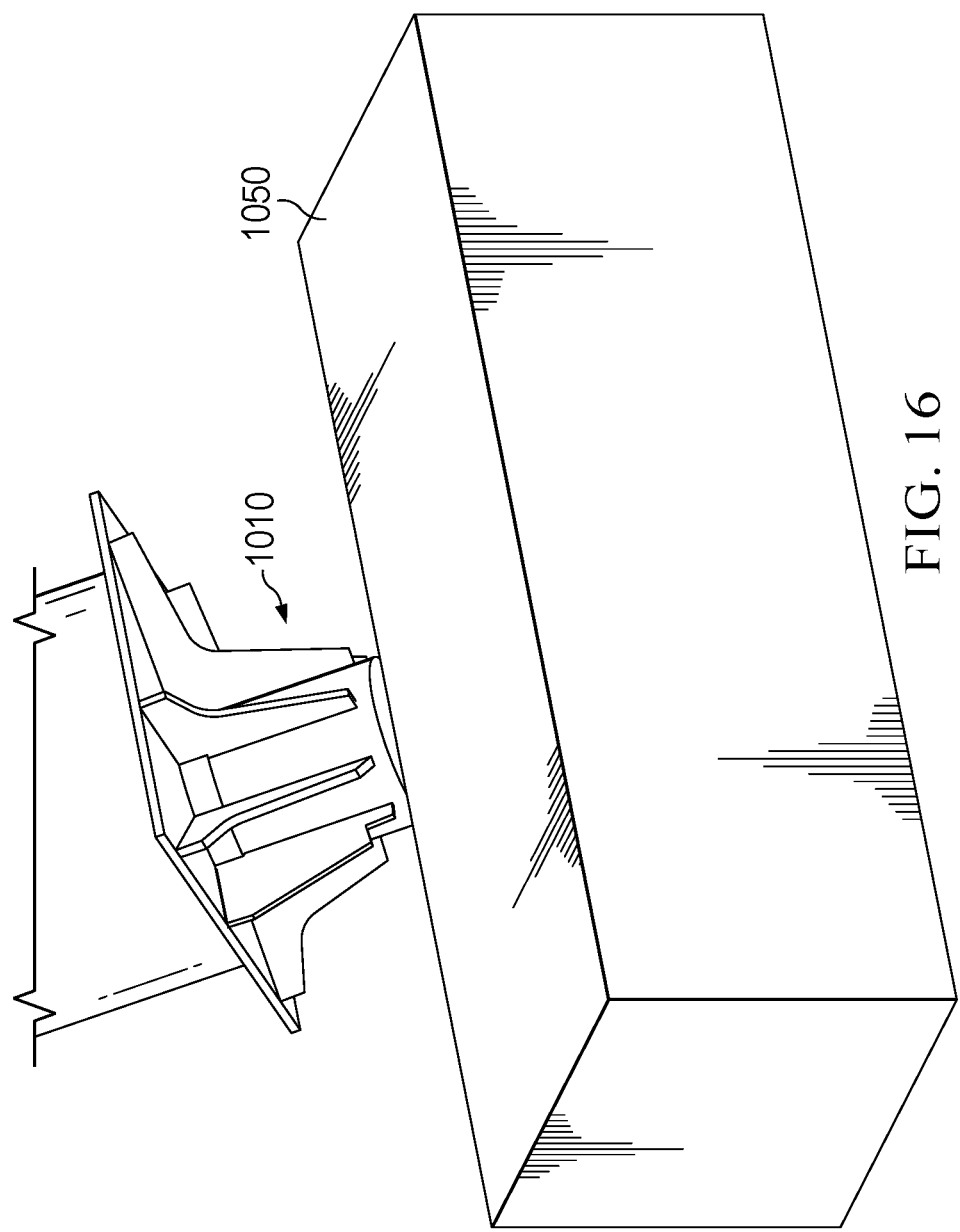
FIG. 16 is an illustration of an isometric view of an end effector in accordance with an illustrative embodiment.

FIG. 16 shows another isometric view of the wrist joint 1010. End effector 1050 is mechanically connected to wrist joint 1010.

Figure 17:
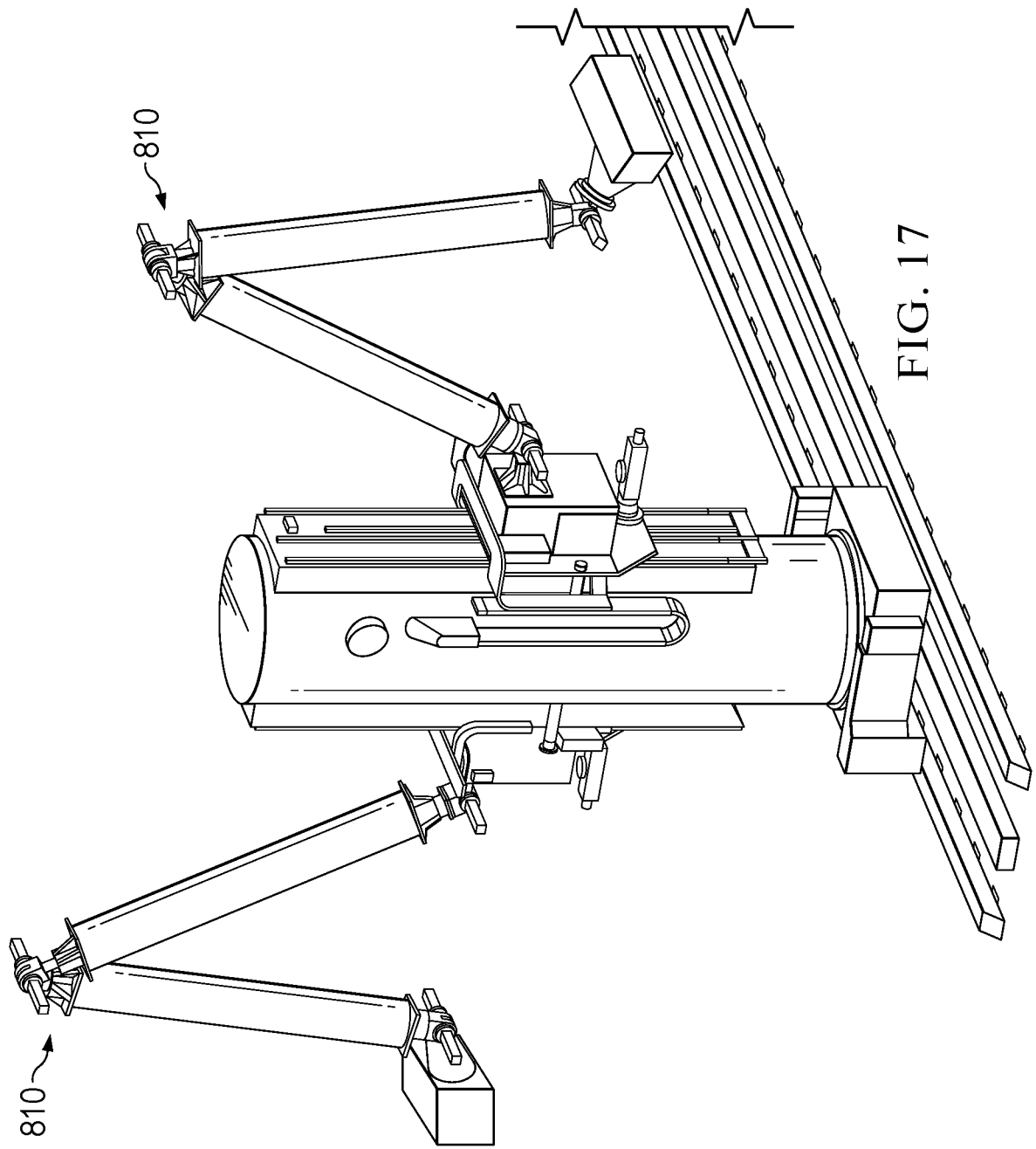
FIG. 17 is an illustration of an isometric view of a reversibly moveable monument with elbows high left and right in accordance with an illustrative embodiment.

FIG. 17 shows an isometric view of a reversibly moveable monument posed with elbows 810 high; left and right. The main body is rotated 90° relative to the posture shown in FIG. 5

Figure 18:
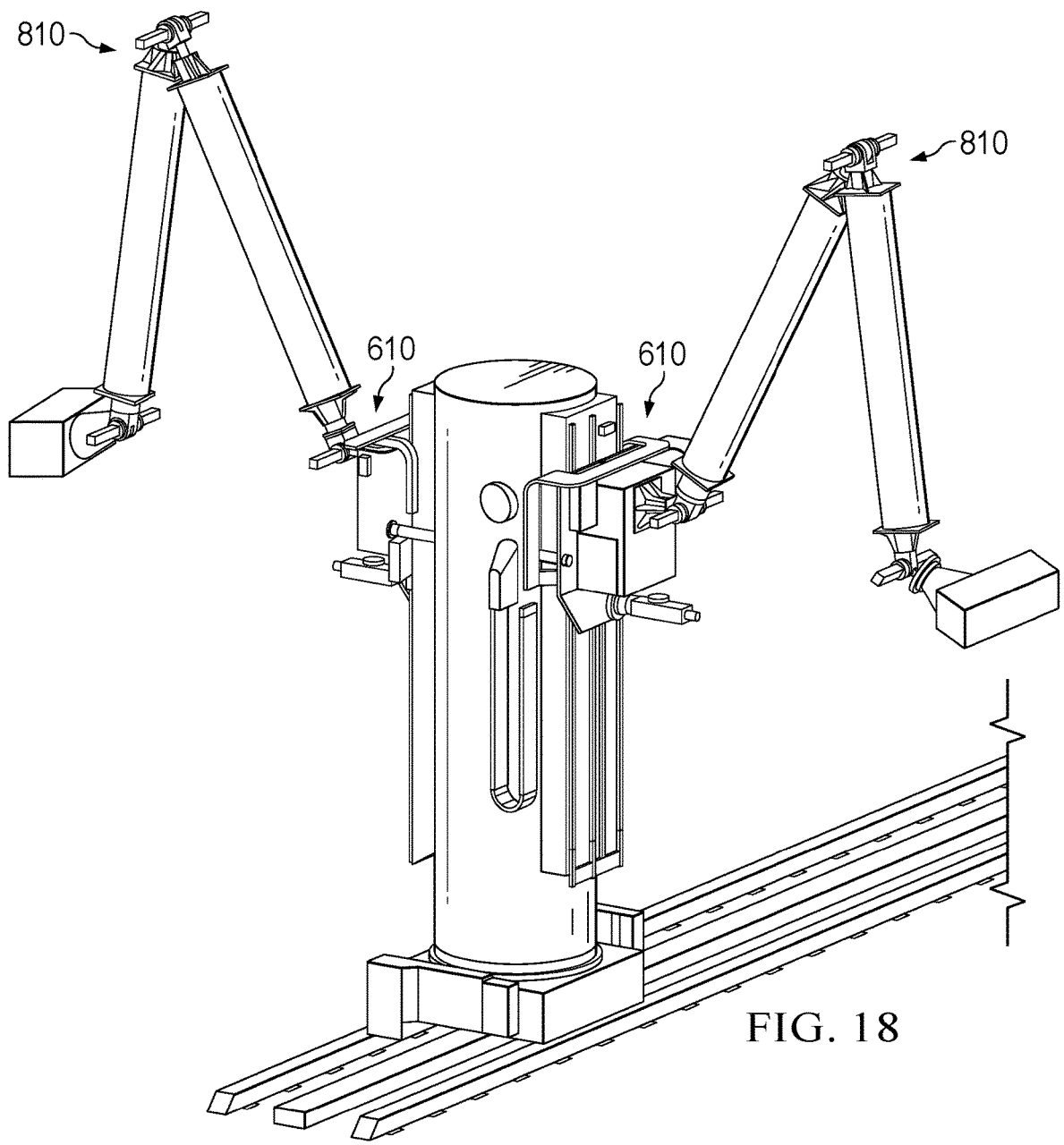
FIG. 18 is an illustration of an isometric view of a reversibly moveable monument with shoulders (the orthogonal joints of the shoulders are translated upward) and elbows high; left and right in accordance with an illustrative embodiment.

FIG. 18 shows an isometric view of a reversibly moveable monument posed with shoulders 610 and elbows 810 high; left and right. The orthogonal joints of the shoulders are translated upward.

Figure 19:
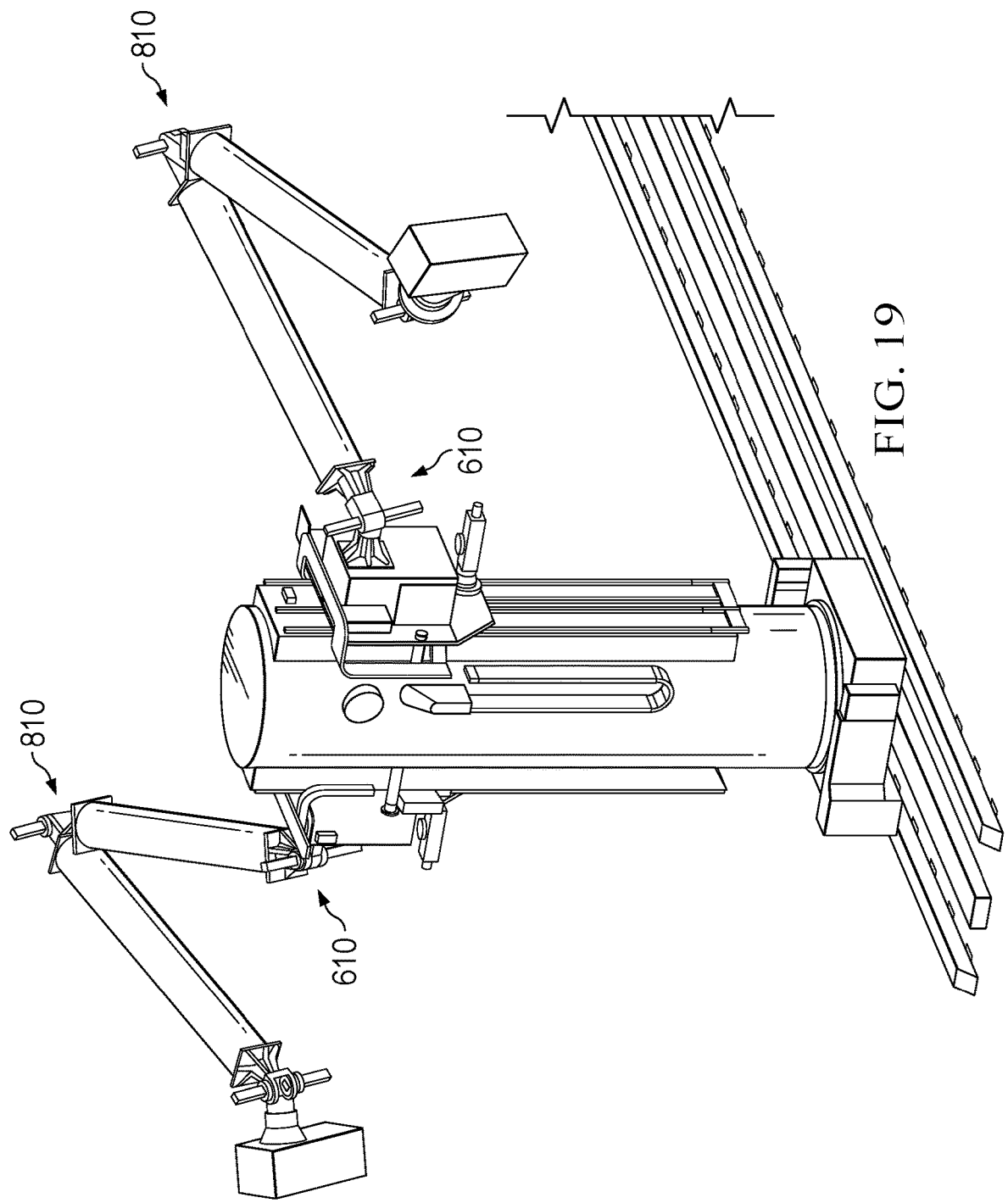
FIG. 19 is an illustration of an isometric view of a reversibly moveable monument with elbows back, shoulders high left and right in accordance with an illustrative embodiment.

FIG. 19 shows an isometric view of a reversibly moveable monument posed with elbows 810 back, shoulders 610 high; left and right. The first twisting joints of the shoulders are rotated.

Figure 20:
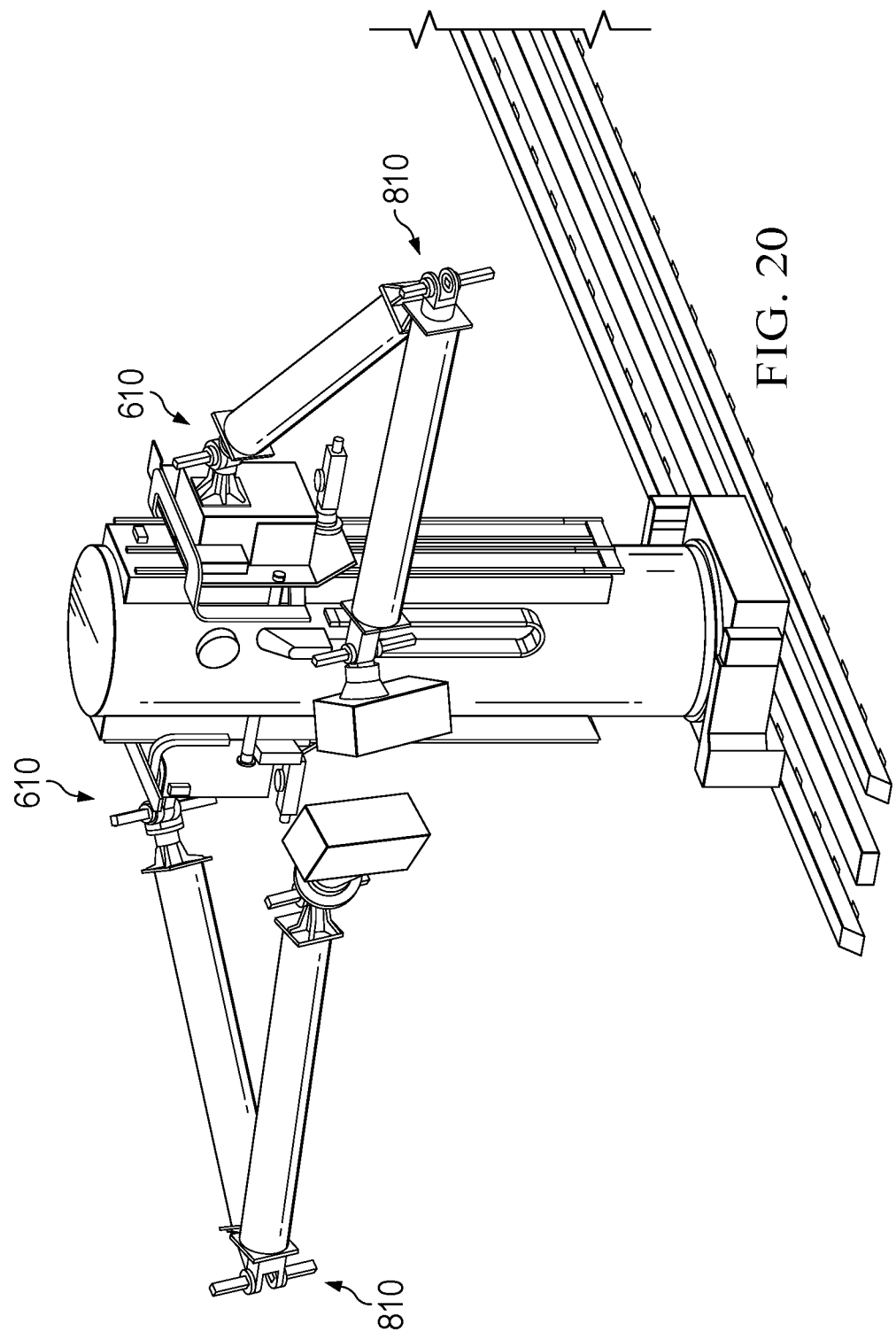
FIG. 20 is an illustration of an isometric view of a reversibly moveable monument with elbows forward, shoulders high left and right in accordance with an illustrative embodiment.

FIG. 20 shows an isometric view of a reversibly moveable monument posed with elbows 810 forward, shoulders 610 high; left and right. The rotational joints of the shoulders are rotated.

Figure 21:
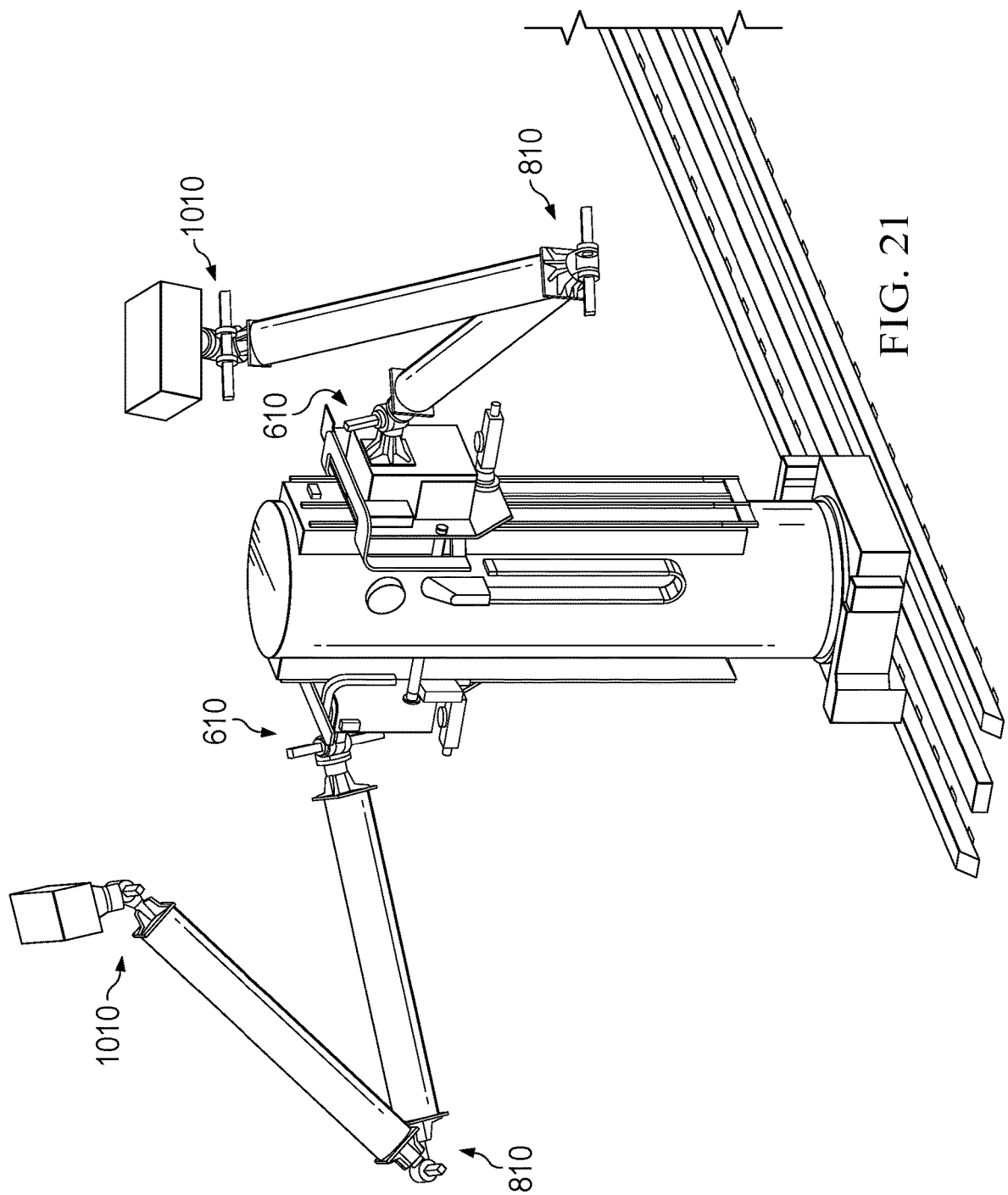
FIG. 21 is an illustration of an isometric view of a reversibly moveable monument with elbows forward, wrists and shoulders high left and right in accordance with an illustrative embodiment.

FIG. 21 shows an isometric view of a reversibly moveable monument posed with elbows 810 forward, wrists 1010 and shoulders 610 high; left and right. Although the second twisting joints of the shoulders are rotated, the third twisting joints of the elbow would have the same effect.

Figure 22:
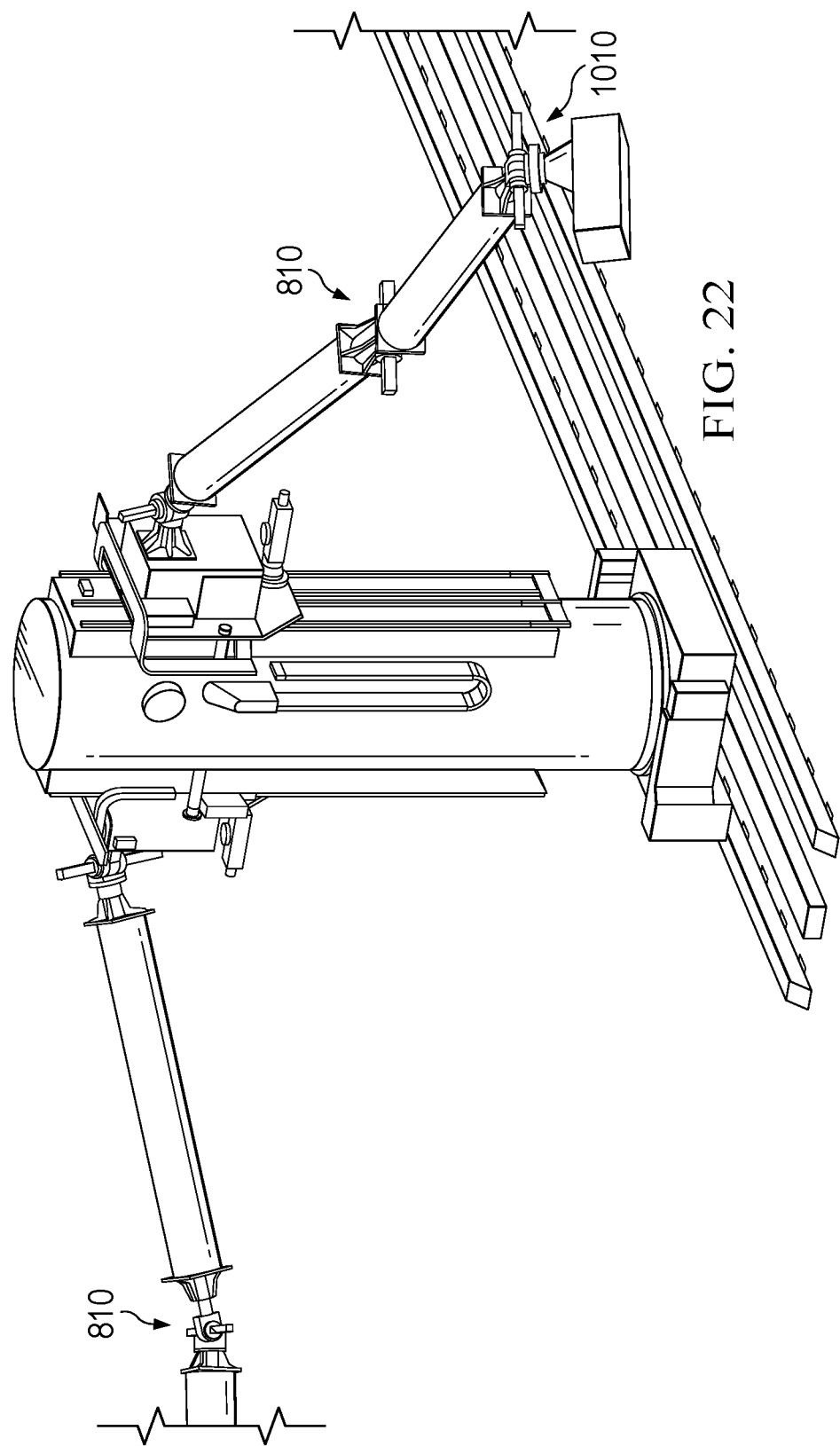
FIG. 22 is an illustration of an isometric view of a reversibly moveable monument with proximal and distal arms spread apart in accordance with an illustrative embodiment.

FIG. 22 shows an isometric view of a reversibly moveable monument posed with elbows 810 and wrist joints 1010 spread apart. The elbow rotational joints are rotated.

Figure 23:
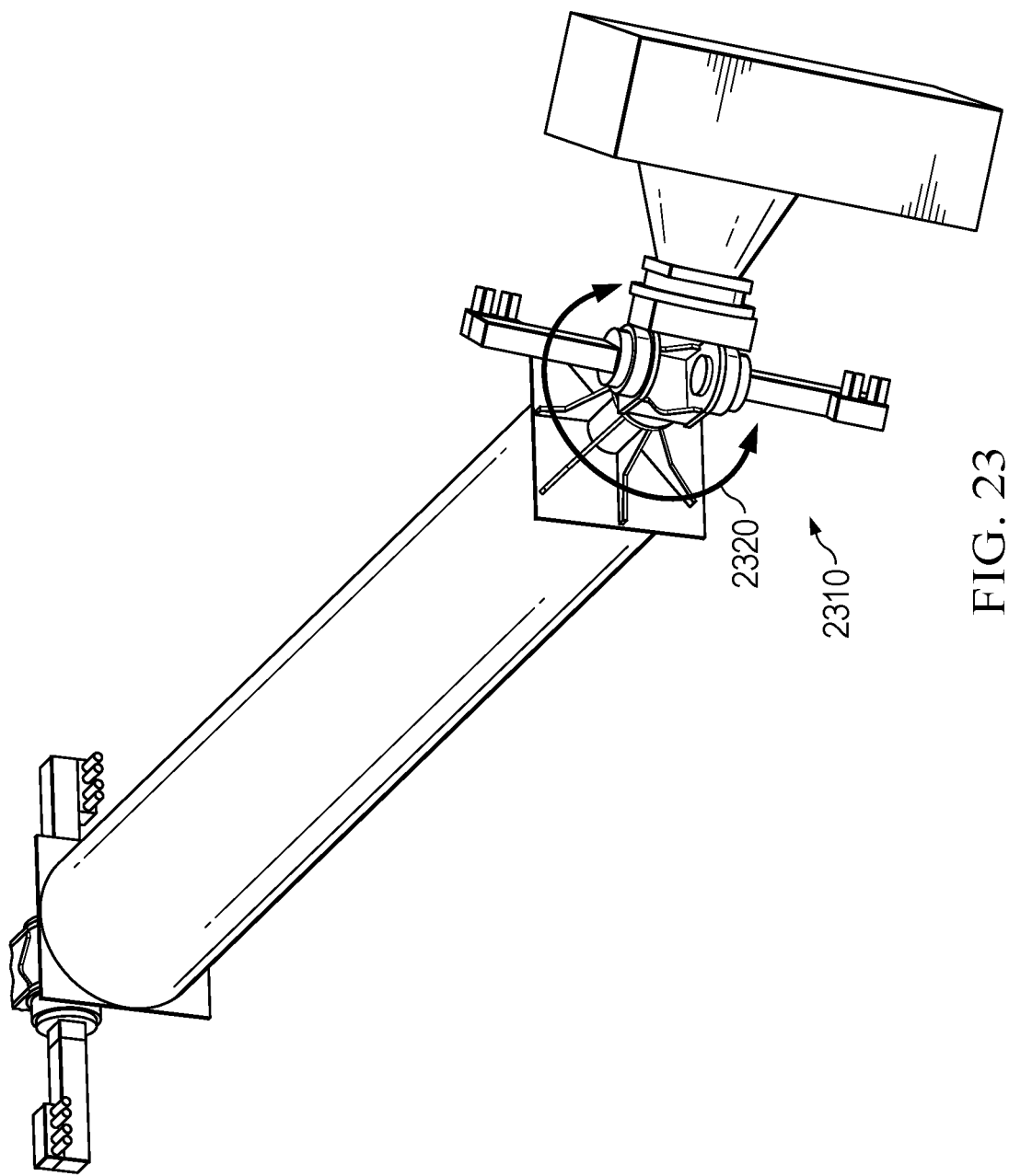
FIG. 23 is an illustration of an isometric view of a wrist joint in accordance with an illustrative embodiment.

FIG. 23 shows an isometric view of a wrist joint 2310 posed in an angled position. The wrist joint 2310 includes a first wrist twisting joint 2320.

Figure 24:
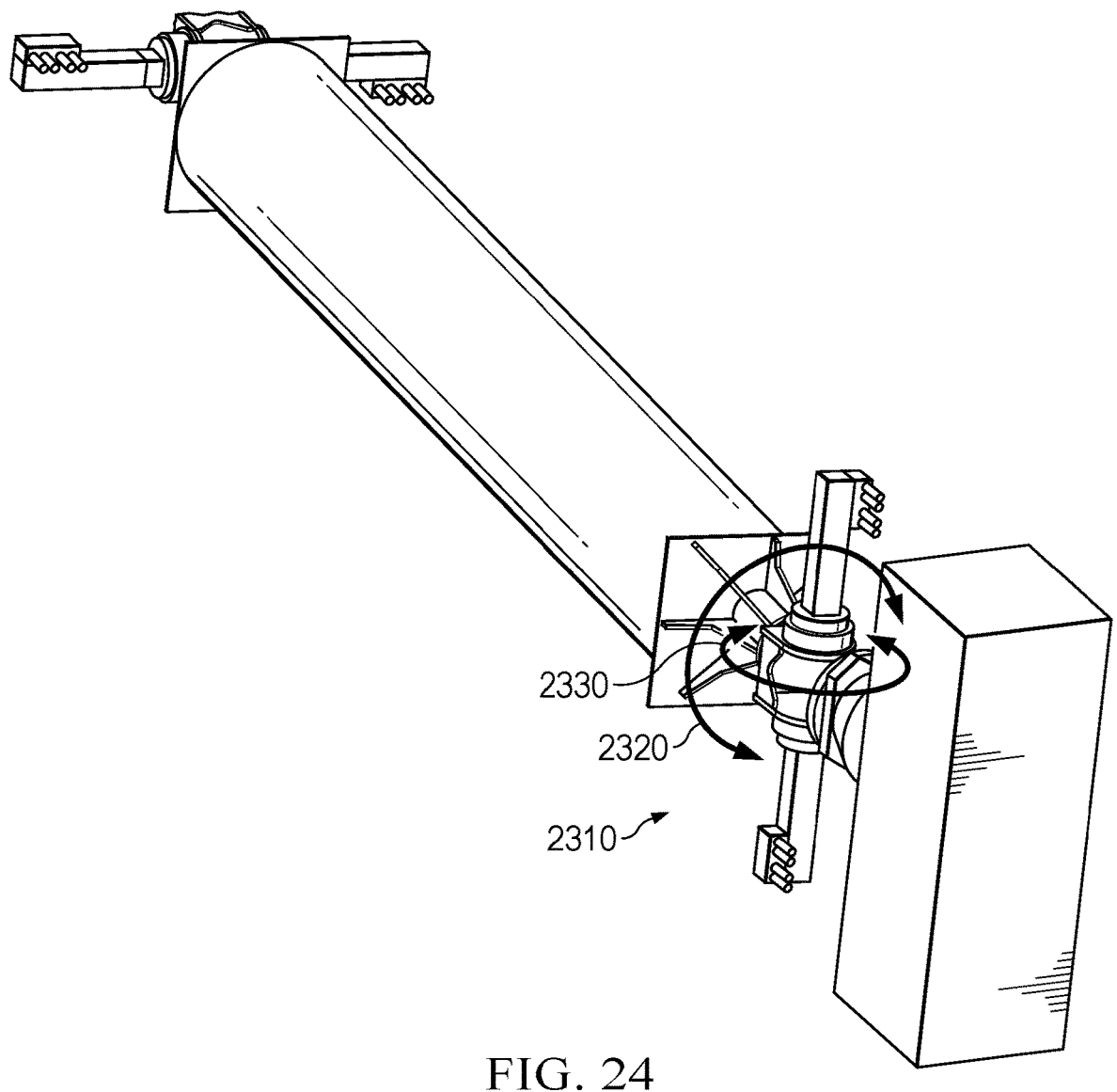
FIG. 24 is an illustration of an isometric view of the wrist joint in accordance with an illustrative embodiment.

FIG. 24 shows an isometric view of the wrist joint 2310 posed in a linear position. A wrist rotational joint 2330 is coupled to the first wrist twisting joint 2320. The wrist rotational joint is positioned differently relative to the view of FIG. 23.

Figure 25:
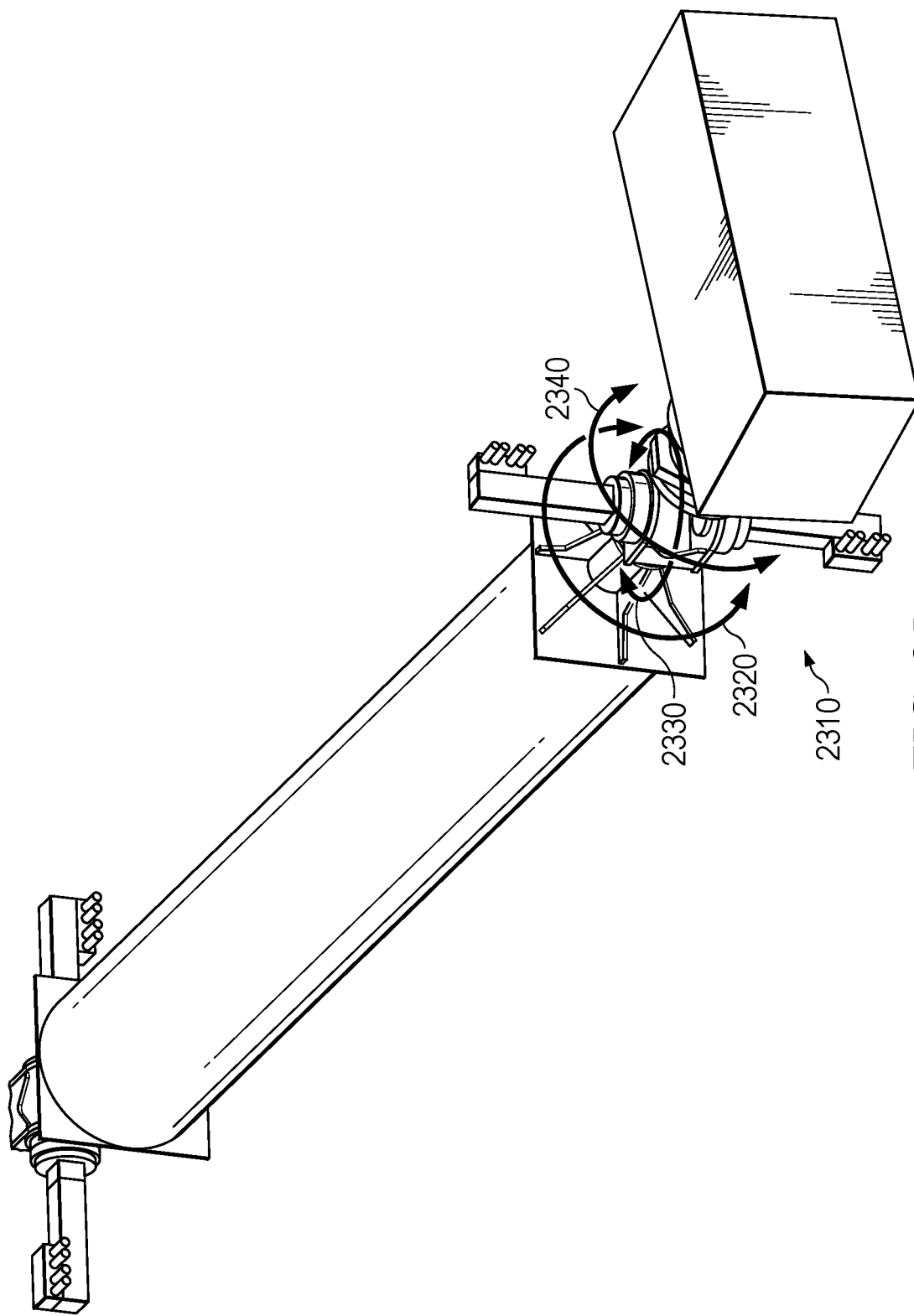
FIG. 25 is an illustration of an isometric view of the wrist joint in accordance with an illustrative embodiment.

FIG. 25 shows an isometric view of the wrist joint 2310 with the end effector rotated approximately 90 degrees counter-clockwise relative to the posture shown in FIG. 24. A second wrist twisting joint 2340 is coupled to the wrist rotational joint 2330. The second wrist twisting joint is positioned differently relative to the view of FIG. 24.

Figure 26:
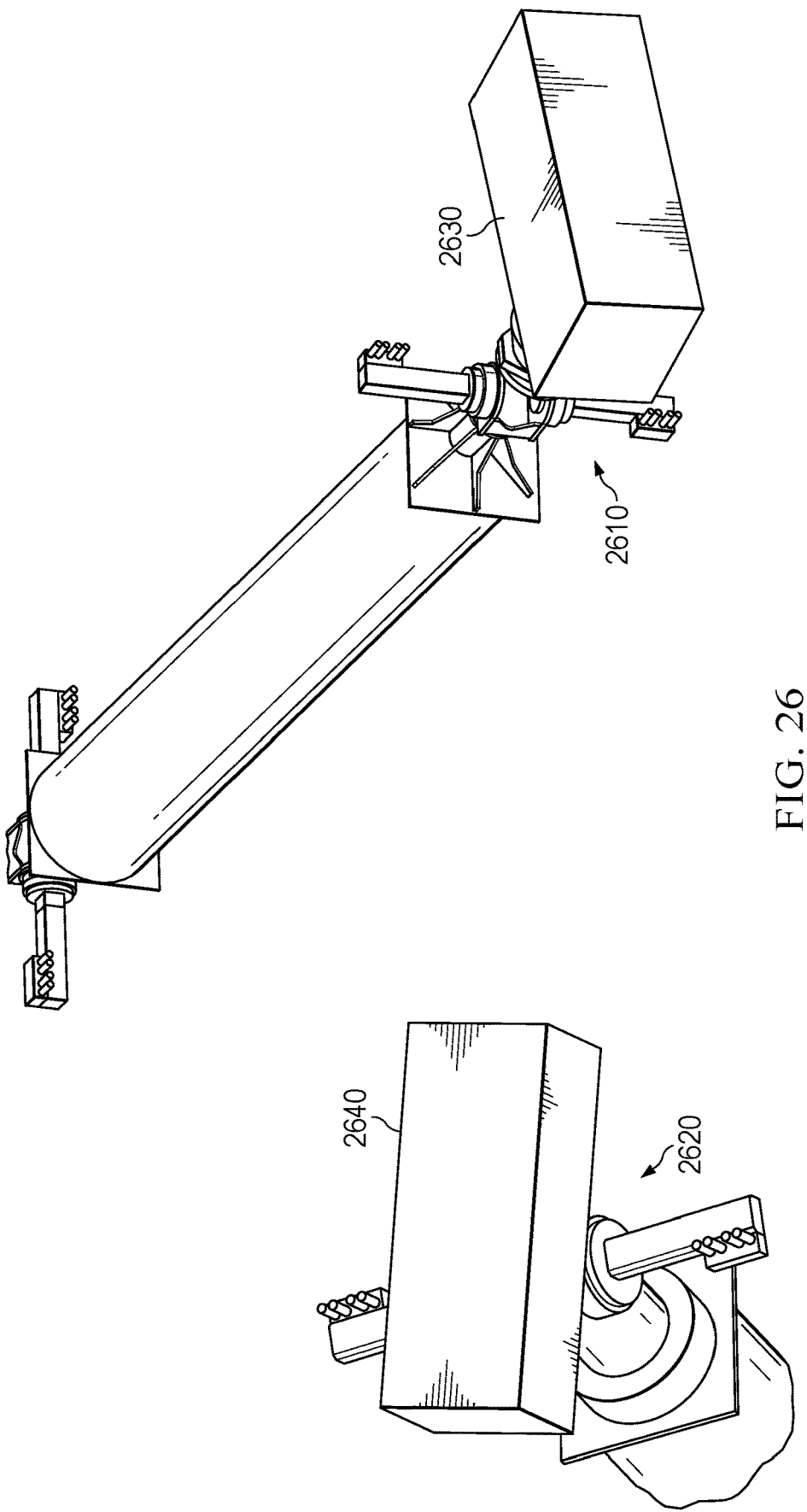
FIG. 26 is an illustration of an isometric view of two different end effectors in accordance with an illustrative embodiment

FIG. 26 shows an isometric view of a first wrist joint 2610 and a second wrist joint 2620. There are two different end effectors coupled to the two wrist joints. In an embodiment, the end of arm tooling is designed to be interchangeable for various types of applications. For example, two different arrayed print head end effectors can be coupled to the two wrist joints. A first type of end effector 2630 is coupled to the first wrist joint 2610. A second type of end effector 2640 is coupled to the second wrist joint 2620. The first type has an array with more print heads for faster coverage of larger areas. The second type has fewer heads optimized for fine line or detail work In a concerted group, a first serial robotic manipulator includes at least one of a first type of end effector, the fourth serial robotic manipulator includes at least one of the first type of end effector, the third serial robotic manipulator includes at least one of a second type of end effector, the fifth serial robotic manipulator including at least one of the second type of end effector. In this embodiment, the first type of end effector and the second type of end effector are different and are manipulated to produce concerted motion with respect to the first type of end effector being primary and the second type of end effector being secondary.

Figure 30:
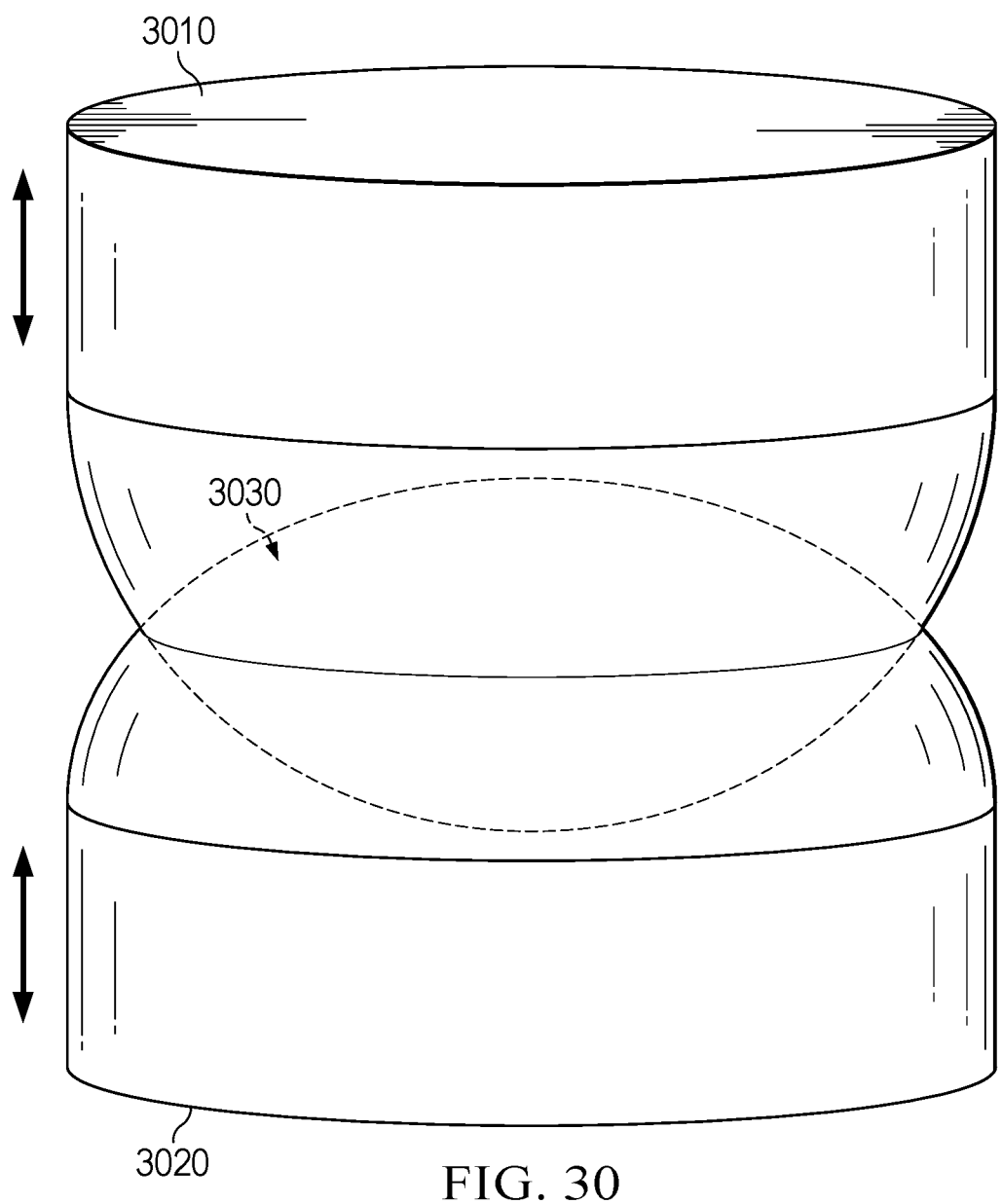
FIG. 30 is an illustration of a geometric construct diagram showing overlap in accordance with an illustrative embodiment.

FIG. 30 shows a geometric construct diagram of two overlapped quasi-hemispheres defined by aggregated end effector range of motion for two different monuments. A first monument is located above the crossbeams and a second monument is located below the crossbeams in an open pit. A first quasi-hemisphere 3010 illustrates the end effector range of motion for the first monument. In an embodiment the first monument includes two 3+2+3 joint manipulators. A second quasi-hemisphere 3020 illustrates end effector range of motion for the second monument. In this embodiment, the second monument includes two 3+2+3 joint manipulators. The overlap 3030 is the intersection of these two quasi-hemispheres. The double headed arrows are intended to show potential shoulder movement on the monument that would affect the size of the overlap 3030. The range of motion illustrated in the construct corresponds to maximum shoulder elevation. Overlap volume is the intercept of, or space within, both of the illustrated aggregated end effector ranges of motion. Thus, the overlap can be accurately defined as percent by volume total (or partial with regard to only its own volume).

Figure 27:
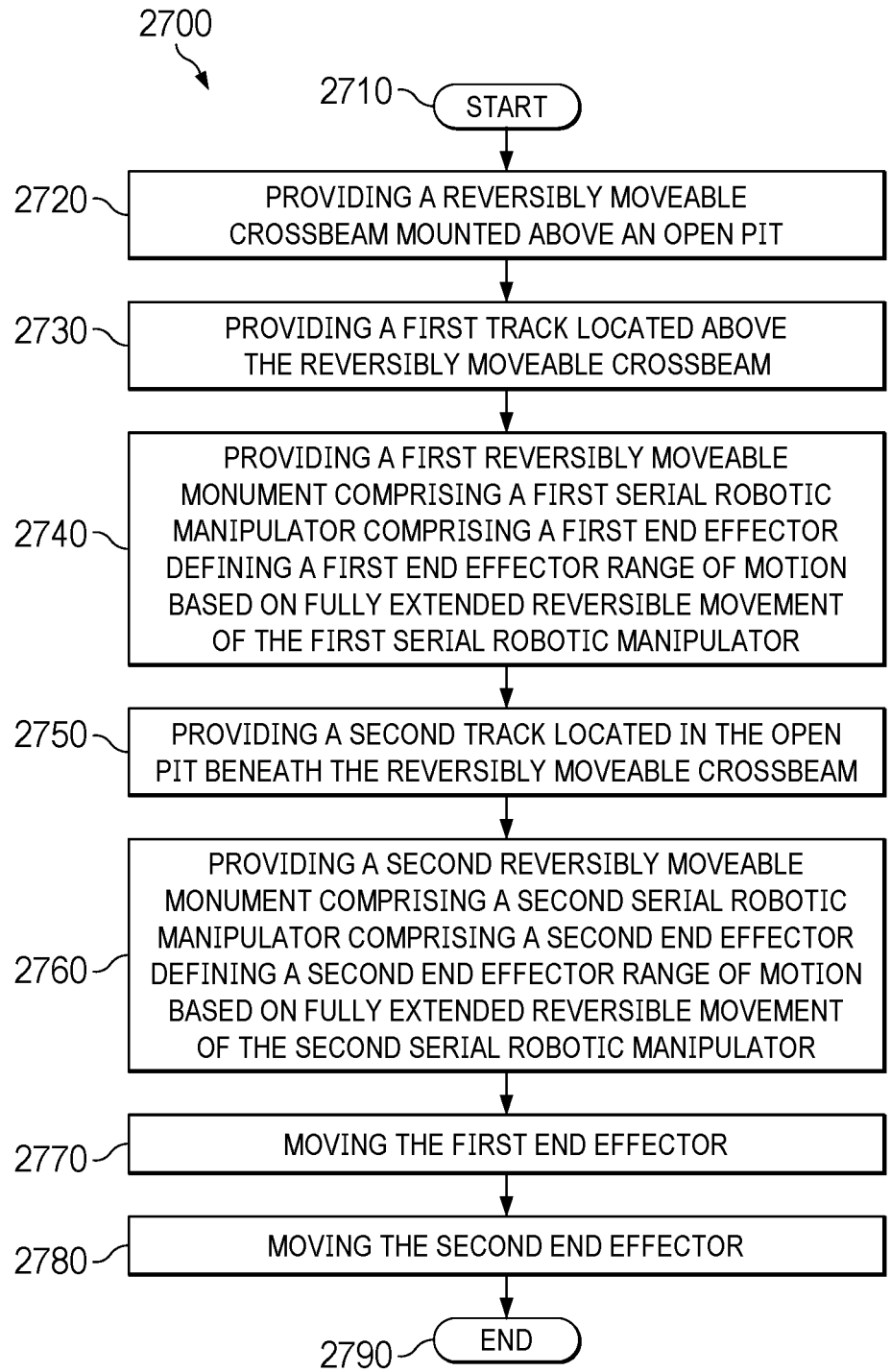
FIG. 27 is an illustration of a flowchart of a process for ink jet printing an exterior of a vehicle in accordance with an illustrative embodiment.

FIG. 27 shows a flowchart of an embodiment of a process 2700 for ink jet printing an exterior surface of a vehicle. The process begins at start operation 2710. At operation 2720 the process includes providing a reversibly moveable crossbeam mounted above an open pit. At operation 2730 the process includes providing a first track located above the reversibly moveable crossbeam. At operation 2740 the process includes providing a first reversibly moveable monument comprising a first serial robotic manipulator comprising a first end effector defining a first end effector range of motion based on fully extended reversible movement of the first serial robotic manipulator. At operation 2750 the process includes providing a second track located in the open pit beneath the reversibly moveable crossbeam. At operation 2760 the process includes providing a second reversibly moveable monument comprising a second serial robotic manipulator comprising a second end effector defining a second end effector range of motion based on fully extended reversible movement of the second serial robotic manipulator. At operation 2770 the process includes moving the first end effector. At operation 2780 the process includes moving the second end effector. The process terminates at stop operation 2790.

Figure 28:
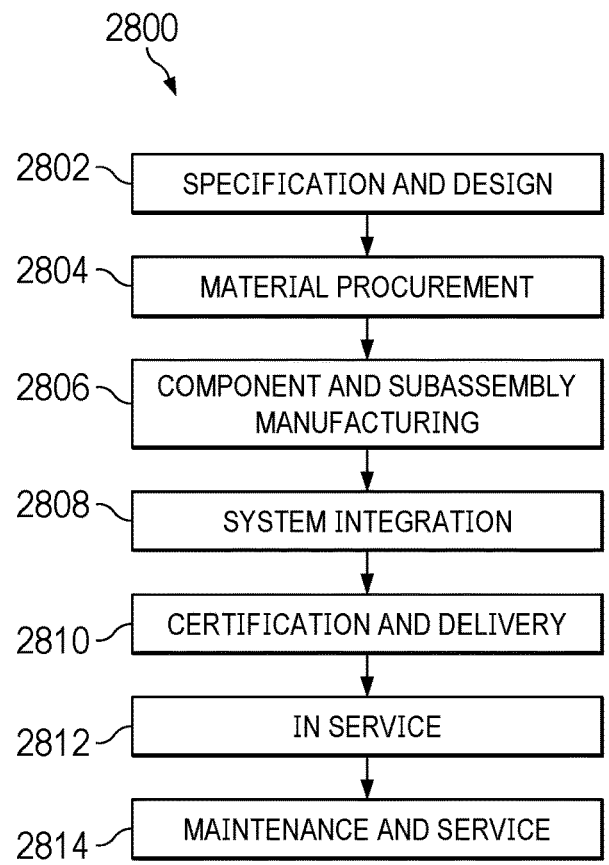
FIG. 28 is an illustration of an aircraft manufacturing and service method in accordance with an illustrative embodiment.
Figure 29:
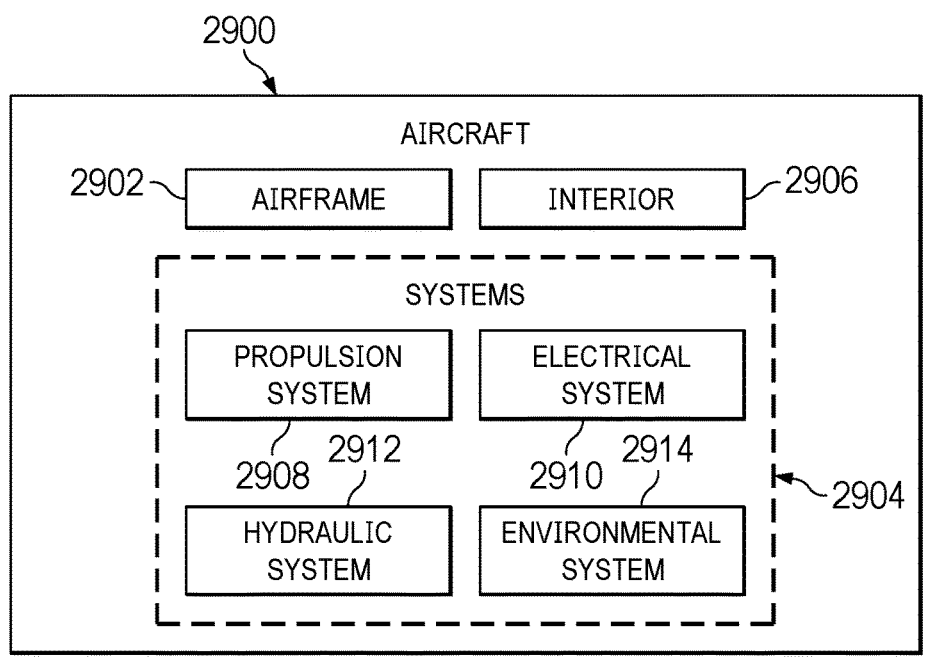
FIG. 29 is an illustration of a block diagram of an aircraft upon which an illustrative embodiment may be implemented.

The first end effector range of motion preferably overlaps the second end effector range of motion. Further, the first end effector extends into the second end effector range of motion or the second end effector extends into the first end effector range of motion Illustrative embodiments of the disclosure may be described in the context of aircraft manufacturing and service method 2800 as shown in FIG. 28 and aircraft 2900 as shown in FIG. 29. Turning first to FIG. 28, an illustration of an aircraft manufacturing and service method is depicted in accordance with an illustrative embodiment. During pre-production, aircraft manufacturing and service method 2800 may include specification and design 2802 of aircraft 2900 in FIG. 29 and material procurement 2804.

During production, component and subassembly manufacturing 2806 and system integration 2808 of aircraft 2900 in FIG. 29 takes place. Thereafter, aircraft 2900 in FIG. 29 can go through certification and delivery 2810 in order to be placed in service 2812. While in service 2812 by a customer, aircraft 2900 in FIG. 29 is scheduled for routine maintenance and service 2814, which may include modification, reconfiguration, refurbishment, and other maintenance or service.

Each of the processes of aircraft manufacturing and service method 2800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 29, an illustration of an aircraft is depicted in which an illustrative embodiment may be implemented. In this example, aircraft 2900 is produced by aircraft manufacturing and service method 2800 in FIG. 28 and may include airframe 2902 with plurality of systems 2904 and interior 2906. Examples of systems 2904 include one or more of propulsion system 2908, electrical system 2910, hydraulic system 2912, and environmental system 2914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2800 in FIG. 28.

In one illustrative example, components or subassemblies produced in component and subassembly manufacturing 2806 in FIG. 28 can be fabricated or manufactured in a manner similar to components or subassemblies produced while aircraft 2900 is in service 2812 in FIG. 28. As yet another example, one or more apparatus embodiments, method embodiments, or a combination thereof can be utilized during production stages, such as component and subassembly manufacturing 2806 and system integration 2808 in FIG. 28. One or more apparatus embodiments, method embodiments, or a combination thereof may be utilized while aircraft 2900 is in service 2812, during maintenance and service 2814 in FIG. 28, or both. The use of a number of the different illustrative embodiments may substantially expedite the assembly of aircraft 2900, reduce the cost of aircraft 2900, or both expedite the assembly of aircraft 2900 and reduce the cost of aircraft 2900.

In embodiments, an ink such as a liquid or solid ink, may be dispensed through the inkjet printheads of the invention herein. Inks of various colors can be used in the inkjet printing herein, including cyan, magenta, yellow, black, red, purple, pink, orange, and the like. In addition, fluorescent ink colors can be used. In other embodiments, a metallic ink can be used such as gold, silver, bronze or the like ink colors.

In embodiments, decorative livery may be printed on a vehicle using the processes described herein, and may include inkjet printing of a variety of colors to provide an inkjet printed livery design on the vehicle.

In embodiments a base coat is coated onto the vehicle, followed by inkjet printing of livery, followed by a final clear top coating.

In embodiments, the robotic arms containing end effectors may be used in sequence or simultaneously.

In embodiments, the inkjet printing devices and processes herein allow for up to 360° inkjet printing of a vehicle, including inkjet printing front, back, sides, topside and underside of a vehicle. Moreover, the inkjet printing devices and processes herein provide for detailed printing of curved surfaces, and printing around obstructions.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of inkjet printing an exterior surface of a vehicle, comprising:
    preparing at least a portion of the exterior surface of the vehicle in a first bay using crossflow or downflow air handling and using explosion protected equipment;
    inkjet printing at least the portion of the exterior surface of the vehicle in a second bay;
    closing doors between the first bay and the second bay before preparing;
    opening doors between the first bay and the second bay after preparing;
    closing doors between the first bay and the second bay before inkjet printing;
    clear-coating at least the portion of the exterior surface of the vehicle in a third bay using downflow or crossflow air handling, using air filtration and using explosion protected equipment;
    opening doors between the second bay and the third bay after inkjet printing;
    closing doors between the second bay and the third bay before clear-coating; and
    mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit,
    wherein the first reversibly moveable crossbeam spans the open pit, and the vehicle is located on the first reversibly moveable crossbeam.

2. The method of claim 1, further comprising removing paint and inspecting at least the portion of the exterior surface of the vehicle in a fourth bay before preparing.

3. The method of claim 1, wherein preparing comprises activating, adhesion promoting, priming, and base-coating.

4. The method of claim 1, further comprising moving the first reversibly moveable crossbeam and the vehicle.

5. The method of claim 4, further comprising mechanically connecting the vehicle to a second reversibly moveable crossbeam, wherein the second bay comprises a first track located above both the first reversibly moveable crossbeam and the second reversibly moveable crossbeam.

6. The method of claim 5, further comprising moving the first reversibly moveable crossbeam, the second reversibly moveable crossbeam and the vehicle, wherein the second reversibly moveable crossbeam spans the open pit, and the vehicle is located on the second reversibly moveable crossbeam.

7. A method of inkjet printing an exterior surface of an aircraft, comprising:
    preparing at least a portion of the exterior surface of the aircraft in a first bay using crossflow or downflow air handling and using explosion protected equipment;
    inkjet printing at least the portion of the exterior surface of the aircraft in a second bay;
    closing doors between the first bay and the second bay before preparing;
    opening doors between the first bay and the second bay after preparing;
    closing doors between the first bay and the second bay before inkjet printing;

clear-coating at least the portion of the exterior surface of the aircraft in a third bay using downflow or crossflow air handling, using air filtration and using explosion protected equipment;
opening doors between the second bay and the third bay after inkjet printing;
closing doors between the second bay and the third bay before clear-coating; and
mechanically connecting the aircraft to a first reversibly moveable crossbeam before inkjet printing, wherein the first reversibly moveable crossbeam is located in the second bay in an open pit and the first reversibly moveable crossbeam is reversibly movable along a length of the open pit,
wherein the first reversibly moveable crossbeam spans the open pit, and the aircraft is located on the first reversibly moveable crossbeam.

8. The method of claim 7, further comprising removing paint and inspecting at least the portion of the exterior surface of the aircraft in a fourth bay before preparing.

9. The method of claim 7, wherein preparing comprises activating, adhesion promoting, priming and base-coating.

10. The method of claim 7, further comprising moving the first reversibly moveable crossbeam and the aircraft.

11. The method of claim 10, further comprising mechanically connecting the aircraft to a second reversibly moveable crossbeam, wherein the second bay comprises a first track located above both the first reversibly moveable crossbeam and the second reversibly moveable crossbeam.

12. The method of claim 11, further comprising moving the first reversibly moveable crossbeam, the second reversibly moveable crossbeam and the aircraft, wherein the second reversibly moveable crossbeam spans the open pit, and the aircraft is located on the second reversibly moveable crossbeam.

13. The method of claim 7, wherein said method allows for up to 360° inkjet printing of the aircraft.

14. A method of inkjet printing an exterior surface of a vehicle, comprising:
preparing at least a portion of the exterior surface of the vehicle in a first bay using crossflow or downflow air handling and using explosion protected equipment;
inkjet printing at least the portion of the exterior surface of the vehicle in a second bay;
closing doors between the first bay and the second bay before preparing;
opening doors between the first bay and the second bay after preparing;
moving the vehicle from the first bay to the second bay after opening doors between the first bay and the second bay;
closing doors between the first bay and the second bay before inkjet printing;
clear-coating at least the portion of the exterior surface of the vehicle in a third bay using downflow or crossflow air handling, using air filtration and using explosion protected equipment;
opening doors between the second bay and the third bay after inkjet printing;
moving the vehicle from the second bay to the third bay after opening doors between the second bay and the third bay;
closing doors between the second bay and the third bay before clear-coating; and
mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit,
wherein the first reversibly moveable crossbeam spans the open pit, and the vehicle is located on the first reversibly moveable crossbeam.

15. The method of claim 14, further comprising removing paint and inspecting at least the portion of the exterior surface of the vehicle in a fourth bay before preparing.

16. The method of claim 14, wherein preparing comprises activating, adhesion promoting, priming, and base-coating.

17. The method of claim 14, further comprising moving the first reversibly moveable crossbeam and the vehicle.

18. The method of claim 17, further comprising mechanically connecting the vehicle to a second reversibly moveable crossbeam, wherein the second bay comprises a first track located above both the first reversibly moveable crossbeam and the second reversibly moveable crossbeam.

19. The method of claim 18, further comprising moving the first reversibly moveable crossbeam, the second reversibly moveable crossbeam and the vehicle, wherein the second reversibly moveable crossbeam spans the open pit, and the vehicle is located on the second reversibly moveable crossbeam.

20. A method of inkjet printing an exterior surface of a vehicle, comprising:
preparing at least a portion of the exterior surface of the vehicle in a first bay using crossflow or downflow air handling and using explosion protected equipment;
inkjet printing at least the portion of the exterior surface of the vehicle in a second bay;
clear-coating at least the portion of the exterior surface of the vehicle in a third bay using downflow or crossflow air handling, using air filtration and using explosion protected equipment; and
mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit,
wherein the portion of the exterior surface of the vehicle comprises at least one curved surface, and
wherein preparing comprises activating, adhesion promoting, priming, and base-coating, wherein the first reversibly moveable crossbeam spans the open pit, and the vehicle is located on the first reversibly moveable crossbeam.

21. A method of inkjet printing an exterior surface of a vehicle, comprising:
preparing at least a portion of the exterior surface of the vehicle in a first bay using crossflow or downflow air handling and using explosion protected equipment;
inkjet printing at least the portion of the exterior surface of the vehicle in a second bay;
clear-coating at least the portion of the exterior surface of the vehicle in a third bay using downflow or crossflow air handling, using air filtration and using explosion protected equipment; and
mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit, and
wherein preparing comprises activating, adhesion promoting, priming, and base-coating, wherein the first reversibly moveable crossbeam spans the open pit, and the vehicle is located on the first reversibly moveable crossbeam.

\* \* \* \* \*